United States Patent
Lan et al.

(10) Patent No.: US 10,908,868 B2
(45) Date of Patent: Feb. 2, 2021

(54) DATA PROCESSING METHOD AND MOBILE DEVICE

(71) Applicant: Huawei Technologies Co., Ltd., Shanzhen (CN)

(72) Inventors: Juan Lan, Shenzhen (CN); Shuangxiong Wen, Shenzhen (CN); Qiang Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/481,417

(22) PCT Filed: Mar. 3, 2017

(86) PCT No.: PCT/CN2017/075633
§ 371 (c)(1),
(2) Date: Jul. 26, 2019

(87) PCT Pub. No.: WO2018/137276
PCT Pub. Date: Aug. 2, 2018

(65) Prior Publication Data
US 2020/0019366 A1    Jan. 16, 2020

(30) Foreign Application Priority Data

Jan. 26, 2017   (CN) .......................... 2017 1 0061746
Feb. 9, 2017    (WO) ................ PCT/CN2017/073173

(51) Int. Cl.
*G06F 3/147*     (2006.01)
*G06F 3/0482*    (2013.01)
(Continued)

(52) U.S. Cl.
CPC ............ *G06F 3/147* (2013.01); *G06F 1/1643* (2013.01); *G06F 1/1647* (2013.01);
(Continued)

(58) Field of Classification Search
CPC ...... G06F 3/147; G06F 1/1643; G06F 1/1647; G06F 1/1692; G06F 3/0482; G06F 3/04883; G06F 3/1431
See application file for complete search history.

(56) References Cited

U.S. PATENT DOCUMENTS

2012/0081268 A1*   4/2012   Sirpal ................... G06F 3/0486
                                                              345/1.1
2013/0271417 A1   10/2013   Nagao
(Continued)

FOREIGN PATENT DOCUMENTS

CN      201628881 U     11/2010
CN      202383558 U     8/2012
(Continued)

OTHER PUBLICATIONS

Machine Translation and Abstract of Chinese Publication No. CN104536711, Apr. 22, 2015, 18 pages.
(Continued)

*Primary Examiner* — Chanh D Nguyen
*Assistant Examiner* — Ngan T. Pham-Lu
(74) *Attorney, Agent, or Firm* — Conley Rose, P.C.

(57) ABSTRACT

Performing data processing on a mobile device, where the mobile device includes a first display, a second display and a second touch panel; the first display is configured to: display a home screen which comprises an icon of a first application; display iconic controls of a first application in response to detecting a first gesture on the icon of the first application; the second display is configured to: display a first GUI of the first application in response to detecting the first gesture; the second touch panel is configured to: detect a second gesture on the second touch panel; display a second GUI of the first application on the second display in response to detecting the second gesture, wherein maintaining display
(Continued)

iconic controls of the first application on the first display when displaying the second GUI on the second display.

20 Claims, 18 Drawing Sheets

(51) Int. Cl.
*G06F 1/16* (2006.01)
*G06F 3/0488* (2013.01)
*G06F 3/14* (2006.01)

(52) U.S. Cl.
CPC .......... *G06F 1/1692* (2013.01); *G06F 3/0482* (2013.01); *G06F 3/04883* (2013.01); *G06F 3/1431* (2013.01)

(56) References Cited

U.S. PATENT DOCUMENTS

| | | | | |
|---|---|---|---|---|
| 2014/0298247 | A1* | 10/2014 | Cho | G06F 3/0481 715/781 |
| 2015/0169182 | A1* | 6/2015 | Khoe | G06F 3/0481 715/781 |
| 2015/0227225 | A1* | 8/2015 | Park | G06F 3/0488 345/173 |
| 2016/0216930 | A1 | 7/2016 | Imana | |
| 2018/0011676 | A1* | 1/2018 | Han | G06F 1/1654 |
| 2018/0129853 | A1* | 5/2018 | Lee | G06F 3/04845 |

FOREIGN PATENT DOCUMENTS

| | | |
|---|---|---|
| CN | 203490899 U | 3/2014 |
| CN | 104182166 A | 12/2014 |
| CN | 104536711 A | 4/2015 |
| CN | 104580705 A | 4/2015 |
| CN | 105511828 A | 4/2016 |
| CN | 106027791 A | 10/2016 |
| CN | 106125845 A | 11/2016 |
| CN | 106155551 A | 11/2016 |
| CN | 106210328 A | 12/2016 |
| WO | 2014190862 A1 | 12/2014 |

OTHER PUBLICATIONS

Machine Translation and Abstract of Chinese Publication No. CN104580705, Apr. 29, 2015, 18 pages.
Machine Translation and Abstract of Chinese Publication No. CN106027791, Oct. 12, 2016, 21 pages.
Machine Translation and Abstract of Chinese Publication No. CN106125845, Nov. 16, 2016, 12 pages.
Machine Translation and Abstract of Chinese Publication No. CN106155551, Nov. 23, 2016, 31 pages.
Machine Translation and Abstract of Chinese Publication No. CN106210328, Dec. 7, 2016, 32 pages.
Machine Translation and Abstract of Chinese Publication No. CN201628881, Nov. 10, 2010, 7 pages.
Machine Translation and Abstract of Chinese Publication No. CN202383558, Aug. 15, 2012, 5 pages.
Machine Translation and Abstract of Chinese Publication No. CN203490899, Mar. 19, 2014, 8 pages.
Foreign Communication From a Counterpart Application, PCT Application No. PCT/CN2017/075633, English Translation of International Search Report dated Oct. 31, 2017, 2 pages.
Foreign Communication From a Counterpart Application, PCT Application No. PCT/CN2017/075633, English Translation of Written Opinion dated Oct. 31, 2017, 5 pages.

* cited by examiner

DATA PROCESSING METHOD AND MOBILE DEVICE

CROSS-REFERENCE TO RELATED APPLICATIONS

This application is a national stage of International Application No. PCT/CN2017/075633, filed on Mar. 3, 2017, which claims priority to International Patent Application No. PCT/CN2017/073173, filed on Feb. 9, 2017 and Chinese Patent Application No. 201710061746.7, filed on Jan. 26, 2017. Both of the aforementioned applications are hereby incorporated by reference in their entireties.

TECHNICAL FIELD

The present invention relates to the field of data processing, and in particular, to a data processing method and a mobile device.

BACKGROUND

With popularity of the mobile Internet, a growing quantity of users are accustomed to reading ebooks on mobile devices (such as mobile phones, tablet computers, and ebook readers). When reading an ebook on a mobile device, a user needs to perform page flip. Page flip is usually implemented by the user by touching a screen of the mobile device with a finger, to turn to a next page or return to a previous page. To enable the ebook to accurately jump to a particular chapter that the user desires to read, the user needs to perform many complex operations. As shown in FIG. 1, in a Kindle ebook reader 100 manufactured by Amazon US, if a user needs to jump to a particular chapter, the user needs to touch and hold, by using a finger, a circle dot 101 on a progress bar 102 displayed on a screen 103, and make the finger slide leftwards or rightwards along the progress bar 102, so as to jump to the specific chapter required by the user. It can be learned from above that such page flip and jumping operations are very complex and it is difficult to accurately locate a chapter in a book. This greatly reduces transaction processing efficiency of the mobile device.

SUMMARY

To resolve the foregoing technical problem, embodiments of this application provide a data processing method and a mobile device, to reduce operation steps of a user, improve transaction processing efficiency of a mobile device, and further enhance user experience.

According to a first aspect, an embodiment provides a method for performing data processing on a mobile device. The mobile device includes a touch display screen disposed on a front face of the mobile device, and a low power display screen and a touch panel that are disposed on a rear face of the mobile device, the touch display screen is a capacitive touchscreen, and the low power display screen is an electronic ink screen. The method includes: detecting, by the touch display screen, a touch operation of a user; determining, by the mobile device in response to the touch operation, whether the touch operation works on an application program of a reading type; when the mobile device determines that the touch operation works on the application program of a reading type, instructing, by the mobile device, the low power display screen to display a first graphical user interface (first GUI) of the application program, and instructing to turn off a power supply of the touch display screen and activate the touch panel, where the first GUI is an interface, in the application program, for displaying content of an ebook; and when the touch panel detects a touch event of the user, determining, by the mobile device based on a speed and a direction of the gesture, an instruction corresponding to the gesture, and executing the instruction, where a result of executing the instruction is: displaying a second graphical user interface (second GUI) of the application program on the low power display screen based on the speed and the direction of the gesture, where the second GUI is used to display a catalogue of the ebook. In this way, the second touch display screen and the touch panel are added on the rear face of the mobile device, and the touch event of the user on the touch panel is detected to execute the corresponding instruction, so that different graphical user interfaces are displayed for the ebook displayed on the second touch display screen. This simplifies operation steps when the user reads the ebook, and also improves transaction processing efficiency of the mobile device.

In some embodiments, the displaying a second graphical user interface of the application program on the low power display screen may be specifically: displaying a part of the catalogue of the ebook on the low power display screen based on the speed and the direction of the gesture.

According to a second aspect, an embodiment provides a method for performing data processing on a mobile device. The mobile device includes a first touch display screen disposed on a front face of the mobile device, and a second touch display screen and a touch panel that are disposed on a rear face of the mobile device. The method includes: when the first touch display screen detects a touch operation of a user, determining, by the mobile device, whether the touch operation works on an application program; when determining that the touch operation works on the application program, determining, by the mobile device, a type of the application program; when the mobile device determines that the type of the application program is reading, instructing, by the mobile device, the second touch display screen to display a first graphical user interface of the application program; and when the touch panel detects a touch event of the user, determining, by the mobile device based on the touch event, an instruction corresponding to the touch event, and executing the instruction, where a result of executing the instruction is: displaying a second graphical user interface of the application program on the second touch display screen based on the touch event.

In some embodiments, the determining, by the mobile device based on the touch event, an instruction corresponding to the touch event, and executing the instruction may be specifically: detecting, by the touch panel at different time points $t_1$, $t_2$, and $t_3$, that positions of three touch points A, B, and C in the touch event are $(x_1, y_1)$, $(x_1, y_2)$, and $(x_3, y_3)$; determining, by the mobile device, a speed and/or a direction of the touch event based on X-axis coordinate values $x_1$, $x_2$, and $x_3$ of the three touch points A, B, and C and the time points $t_1$, $t_2$, and $t_3$; and performing, by the mobile device based on the speed and/or the direction, a fast page flip operation on content of an ebook displayed on the first graphical user interface, and displaying the second graphical user interface of the fast page flip operation on the second touch display screen.

In some embodiments, the second graphical user interface may be used to display a catalogue of the ebook.

In some other embodiments, the touch event is a gesture of sliding on the touch panel by a single finger, and the displaying a second graphical user interface of the application program on the second touch display screen based on the touch event may be specifically: displaying a fast page flip graphical user interface of the application program on the second touch display screen based on a speed and a direction of the sliding gesture.

In some other embodiments, a processor 380 may alternatively instruct a first display panel 341 to display some graphical user interfaces of the application program, and other graphical user interfaces are displayed on a second display panel 342. In this way, a user can focus more on content of interest, and a screen splitting function can be implemented. It may be understood that the some graphical user interfaces displayed on the first display panel 341 may be specifically iconic controls of the application program and the other graphical user interfaces displayed on the second display panel 342 may mainly be substantial content of the application program. For example, if the application program is "reading", content of an ebook that is being read is displayed on the second display panel 342, and some controls such as "page up" and "page down" that are not related to substantial content of the ebook are displayed on the first display panel 341.

In some other embodiments, the mobile device further turns off a power supply of the first touch display screen while the mobile device instructs the second touch display screen to display the first graphical user interface of the application program.

According to a third aspect, an embodiment provides a mobile device for performing data processing. The mobile device includes a first display panel and a first touch panel that are disposed on a front face of the mobile device, and a second display panel and a second touch panel that are disposed on a rear face of the mobile device; and the mobile device further includes a processor, a memory, and a power supply management system. The first display panel is configured to display an icon, a graphical user interface, and a component of an application program; when the first touch panel detects a touch operation of a user, the processor determines whether the touch operation works on application program displayed on the first display panel; when the processor determines that the touch operation works on the application program, the processor determines a type of the application program; when the processor determines that the type of the application program is reading, the processor instructs the second display panel to display a first graphical user interface of the application program, and instructs the power supply management system to turn off a power supply of the first display panel and activate the second display panel, where the first graphical user interface is an interface, in the application program, for displaying content of an ebook; and when the second touch panel detects a touch event of the user, the processor determines, based on a speed and a direction of the touch event, an instruction corresponding to the touch event, and executes the instruction, where a result of executing the instruction is: displaying a second graphical user interface of the application program on the second display panel based on the speed and the direction of the touch event, where the second graphical user interface is used to display a catalogue of the ebook.

In some embodiments, the first display panel is a liquid crystal display, and the second display panel is an electronic ink screen. In this way, the first display panel may be mainly configured for daily operations of the user, and the second display panel is a display panel of a low power material, and therefore may be configured to read an ebook.

In some other embodiments, the mobile device may be a mobile phone or a tablet computer.

In the foregoing embodiments, the touch operation of the user on the touch panel is detected, to determine to perform processing (for example, page flip or returning to the catalogue) on the content of the ebook displayed on the second display panel. This greatly simplifies operation steps of the user, improves transaction processing efficiency of the mobile device, and further enhances user experience.

According to a fourth aspect, an embodiment provides a method for performing data processing on a mobile device. The mobile device includes a first touch display screen disposed on a front face of the mobile device, and a second touch display screen and a touch panel that are disposed on a rear face of the mobile device, the first touch display screen may be a capacitive touchscreen, and the second touch display screen may be an electronic ink screen. The method may specifically include: detecting a touch operation of a user on the first touch display screen; displaying, in response to the touch operation, a control for an application program on the first touch display screen; and in response to a touch operation performed by the user on the control, displaying a first graphical user interface of the application program on the first touch display screen, and displaying a second graphical user interface of the application program on the second touch display screen, where the first graphical user interface includes a plurality of controls, the second graphical user interface displays content of the application program, and the plurality of controls are used to control the content of the application program.

In some other embodiments, the application program is an application program of a reading type, and the content of the application program may be an ebook.

According to a fifth aspect, an embodiment provides a method for performing data processing on a mobile device. The mobile device includes a first touch display screen disposed on a front face of the mobile device, and a second touch display screen and a touch panel that are disposed on a rear face of the mobile device, the first touch display screen is a capacitive touchscreen, and the second touch display screen is an electronic ink screen. The method includes: detecting a touch operation of a user on the first touch display screen; displaying, in response to the touch operation, a control for an application program on the first touch display screen; and in response to a touch operation performed by the user on the control, displaying a first graphical user interface of the application program on the first touch display screen, and displaying a second graphical user interface of the application program on the second touch display screen, where the first graphical user interface includes a plurality of controls, the second graphical user interface displays content of the application program, and the plurality of controls are used to control the content of the application program.

In some other embodiments, the application program is an application program of a reading type, and the content of the application program is an ebook.

It should be understood that descriptions about the technical features, technical solutions, and advantages or similar descriptions in this specification do not indicate that all the features and advantages may be implemented in any single embodiment. In contrast, it may be understood that descriptions about the features or advantages mean that a particular technical feature, technical solution, or advantage is included in at least one embodiment. Therefore, the descriptions about the technical features, technical solutions, or advantages in this specification do not necessarily indicate a same embodiment. Further, the technical features, technical solutions and advantages described in the following embodiments may be combined in any proper manner. A person skilled in the art should understand that an embodiment may be implemented without one or more particular technical features, technical solutions or advantages of a particular embodiment. In other embodiments, an additional technical feature and advantage may be identified in a particular embodiment that does not embody all the embodiments.

DESCRIPTION OF EMBODIMENTS

A mobile device in the following embodiments may be any device having a wireless communication function, for example, may be a wearable electronic device (for example, a smartwatch) having the wireless communication function, may be a mobile phone 300 shown in FIG. 3, or may be a tablet computer. No special limitation is imposed on a specific form of the mobile device in the following embodiments.

Figure 2A:
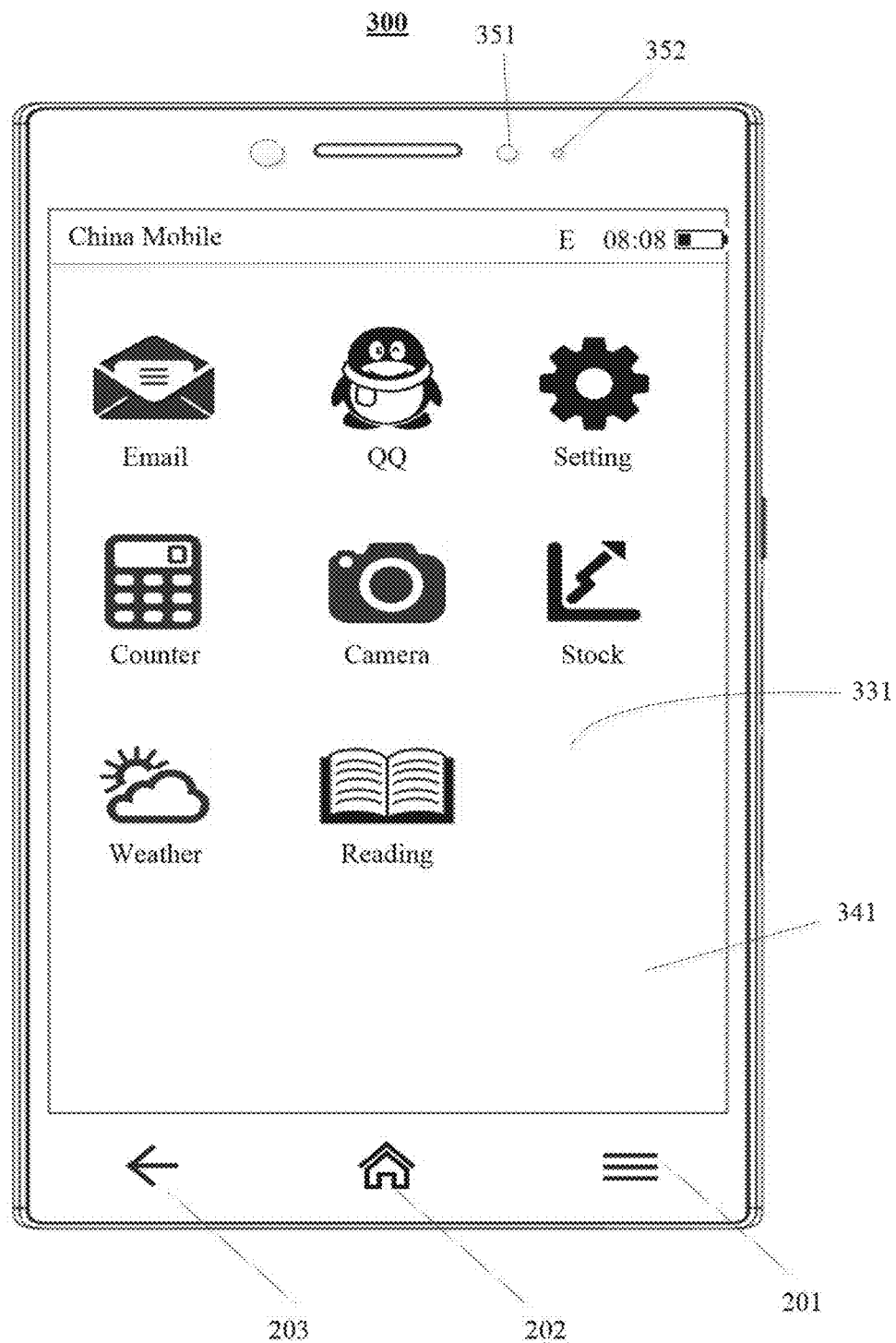
FIG. 2A is a schematic structural diagram of a front face of a mobile phone in some embodiments.
Figure 2B:
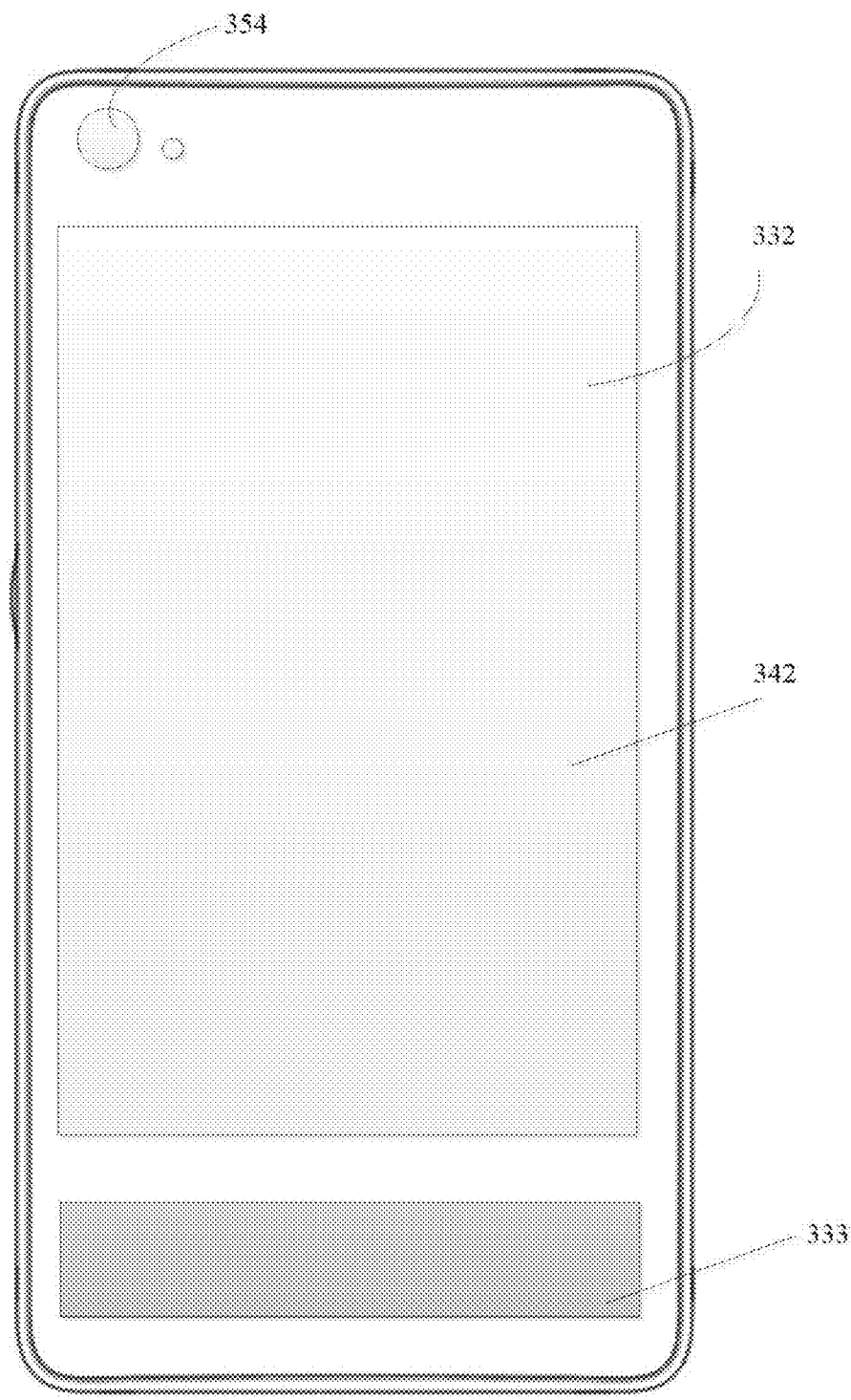
FIG. 2B is a schematic structural diagram of a rear face of a mobile phone in some embodiments.

In the following embodiment, a mobile phone is used as an example to describe how a mobile device implements a specific technical solution in this embodiment. As shown in FIG. 3, the mobile device in this embodiment may be a mobile phone 300. FIG. 2A and FIG. 2B are schematic appearance diagrams of the mobile phone 300. FIG. 2A is a schematic diagram of a front face of the mobile phone 300. FIG. 2B is a schematic diagram of a rear face of the mobile phone 300. The following uses the mobile phone 300 as an example to specifically describe this embodiment.

It should be understood that the mobile phone 300 in the figure is merely an example of the mobile device, and the mobile phone 300 may have more or fewer components than those shown in the figure, a combination of two or more components, or components disposed differently. The components shown in the figure may be implemented by hardware, software, or a combination of hardware and software, where the hardware, the software, or the combination of hardware and software includes one or more signal processing and/or application-specific integrated circuits.

Figure 3:
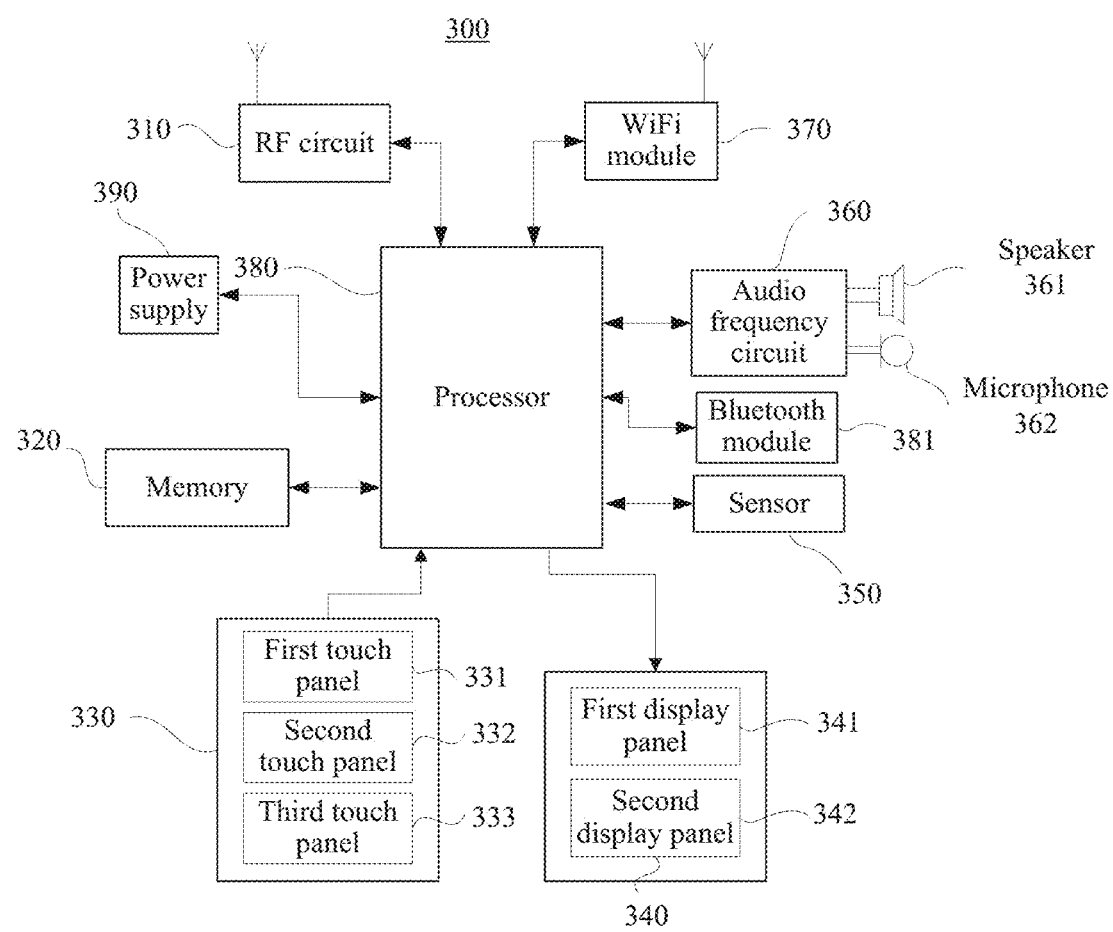
FIG. 3 is a schematic diagram of a hardware structure of a mobile phone in some embodiments.

As shown in FIG. 3, the mobile phone 300 includes components such as an RF (Radio Frequency, radio frequency) circuit 310, a memory 320, an input unit 330, a display unit 340, a sensor 350, an audio frequency circuit 360, a Wi-Fi module 370, a processor 380, and a power supply 390. A person skilled in the art may understand that a structure of the mobile phone shown in FIG. 3 does not constitute a limitation on the mobile phone, and the mobile phone may include more or fewer components than those shown in the figure, a combination of some components, or components disposed differently.

The following specifically describes each component of the mobile phone 300 with reference to FIG. 3.

The RF circuit 310 may be configured to receive and transmit information, or receive and send signals in a call process. The RF circuit 310 may receive downlink information of a base station and then provide the received downlink information for the processor 380 for processing, and send uplink data to the base station. Usually, the RF circuit includes but is not limited to devices such as an antenna, at least one amplifier, a transceiver, a coupler, a low noise amplifier, and a duplexer. In addition, the RF circuit 310 may further communicate with a network and another mobile device through wireless communication. The wireless communication may use any communications standard or protocol, including but not limited to a Global System for Mobile Communications, a general packet radio service, code division multiple access, wideband code division multiple access, Long Term Evolution, an email, a short message service, and the like.

The memory 320 may be configured to store a software program and data. The processor 380 runs the software program and the data that are stored in the memory 320, to perform various functions of the mobile phone 300 and process data. The memory 320 may mainly include a program storage area and a data storage area. The program storage area may store an operating system, an application program required by at least one function (for example, a sound playback function and an image playback function), and the like. The data storage area may store data (for example, audio data and a phone book) created based on use of the mobile phone 300, and the like. In addition, the memory 320 may include a high-speed random access memory, and may further include a non-volatile memory, for example, at least one disk storage device, a flash memory device, or another volatile solid-state storage device. In the following embodiments, the memory 320 stores an operating system that enables the mobile phone 300 to run, for example, an iOS® operating system developed by Apple Inc., an Android® open source operating system developed by Google Inc., and a Windows® operating system developed by Microsoft Corporation.

The input unit 330 (namely, a touchscreen) may be configured to receive entered numeral or character information, and generate signal input related to user setting and function control of the mobile phone 300. Specifically, the input unit 330 may include a first touch panel 331 disposed on a front face of the mobile phone 300. The first touch panel 331 is also referred to as a first touchscreen, and may collect a touch operation of a user on or near the first touch panel 331 (such as an operation performed by the user on the first touch panel 331 or near the first touch panel 331 by using a finger or any proper object or accessory such as a stylus), and drive a corresponding connection apparatus according to a preset program. Optionally, the first touch panel 331 may include two parts: a touch detection apparatus and a touch controller (not shown in the figure). The touch detection apparatus detects a touch orientation of the user, detects a signal brought by the touch operation, and sends the signal to the touch controller. The touch controller receives touch information from the touch detection apparatus, converts the touch information into touch point coordinates, and sends the touch point coordinates to the processor 380, and can receive and execute an instruction sent by the processor 380. In addition, the first touch panel 331 may be implemented in various types, such as a resistive type, a capacitive type, an infrared type, and a face acoustic wave type. In addition to the first touch panel 331, the input unit 330 may further include a second touch panel 332 (also referred to as a second touchscreen) disposed on a rear face of the mobile phone 300. In other words, the first touch panel 331 and the second touch panel 332 are disposed on two opposite faces of the mobile phone 300. Specifically, the second touch panel 332 may use a same structure as the first touch panel 331. Details are not described herein again.

The display unit 340 (namely, a display screen) may be configured to display information entered by the user or information provided for the user, and graphical user interfaces (referred to as GUIs in the following) of various menus of the mobile phone 300. The display unit 340 may include a first display panel 341 (also referred to as a first display screen) disposed on the front face of the mobile phone 300, and a second display panel 342 (also referred to as a second display screen) disposed on the rear face of the mobile phone 300. In other words, the first display panel 341 and the second display panel 342 are disposed on the two opposite faces of the mobile phone 300. The first display panel 341 may be configured by using a liquid crystal display, an organic light-emitting diode, or a like form. The second display panel 342 may be a screen made by using an electronic paper display technology or another low power display material, for example, an electronic ink screen. Therefore, the second display panel 342 may be used to read an ebook, a magazine, and the like. Certainly, the second display panel 342 may alternatively use a same display material as the first display panel 341.

Figure 1:
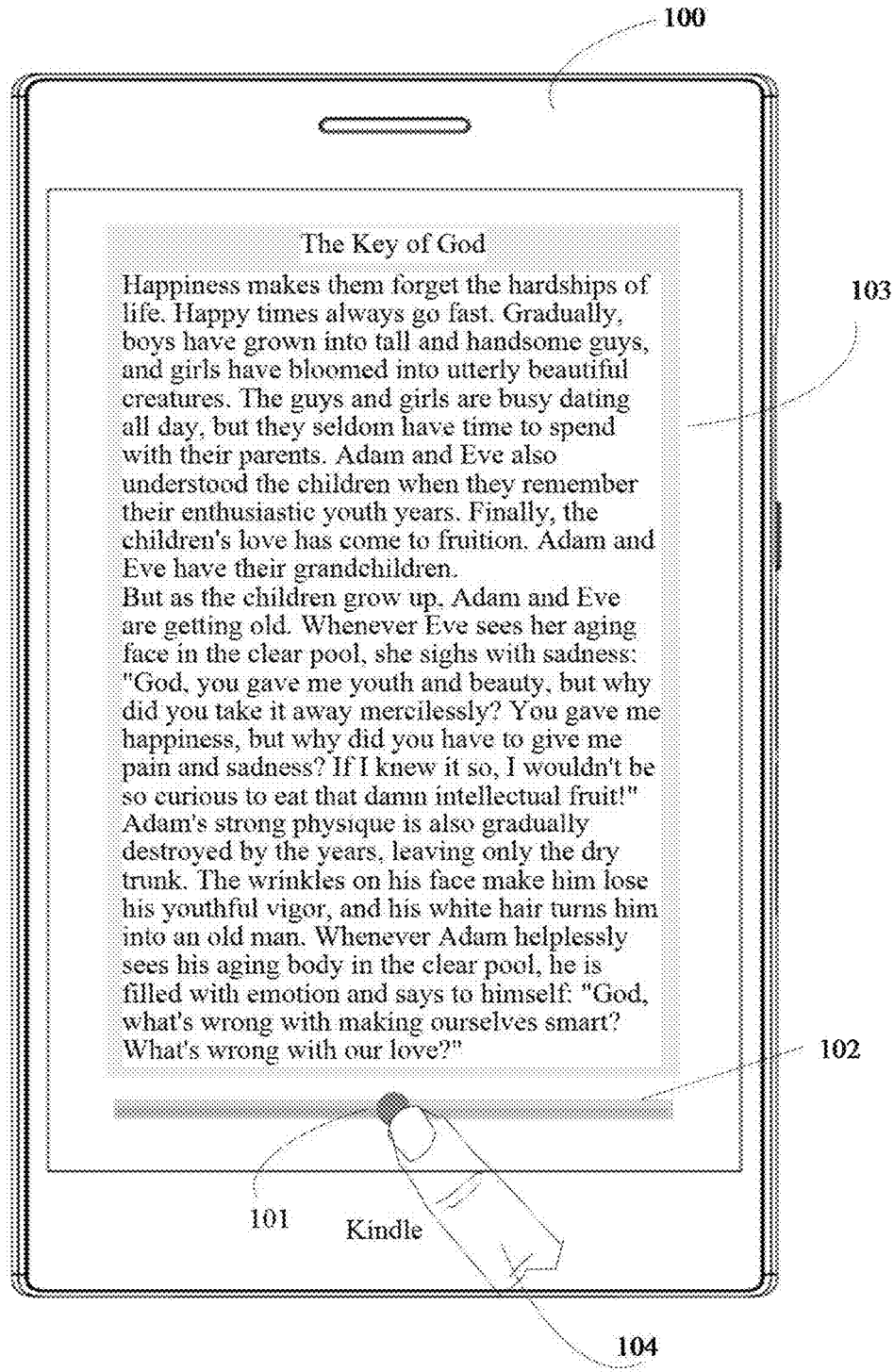
FIG. 1 is a schematic diagram of a user interface of a page flip or a page jump in the prior art.
Figure 5:
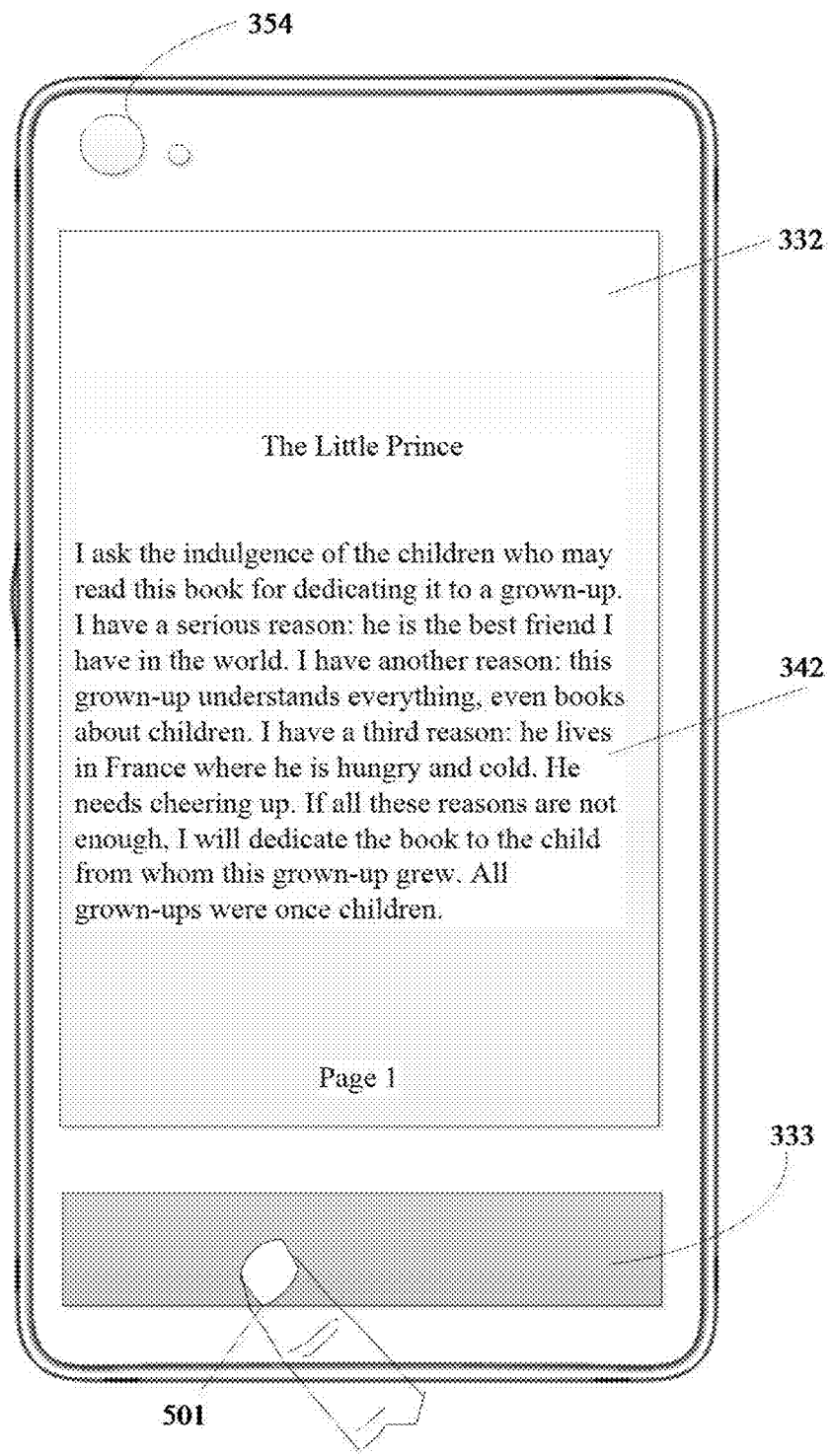
FIG. 5 is a schematic diagram of a graphical user interface displayed by a second display panel 342 on a rear face of a mobile phone in some embodiments.
Figure 11A:
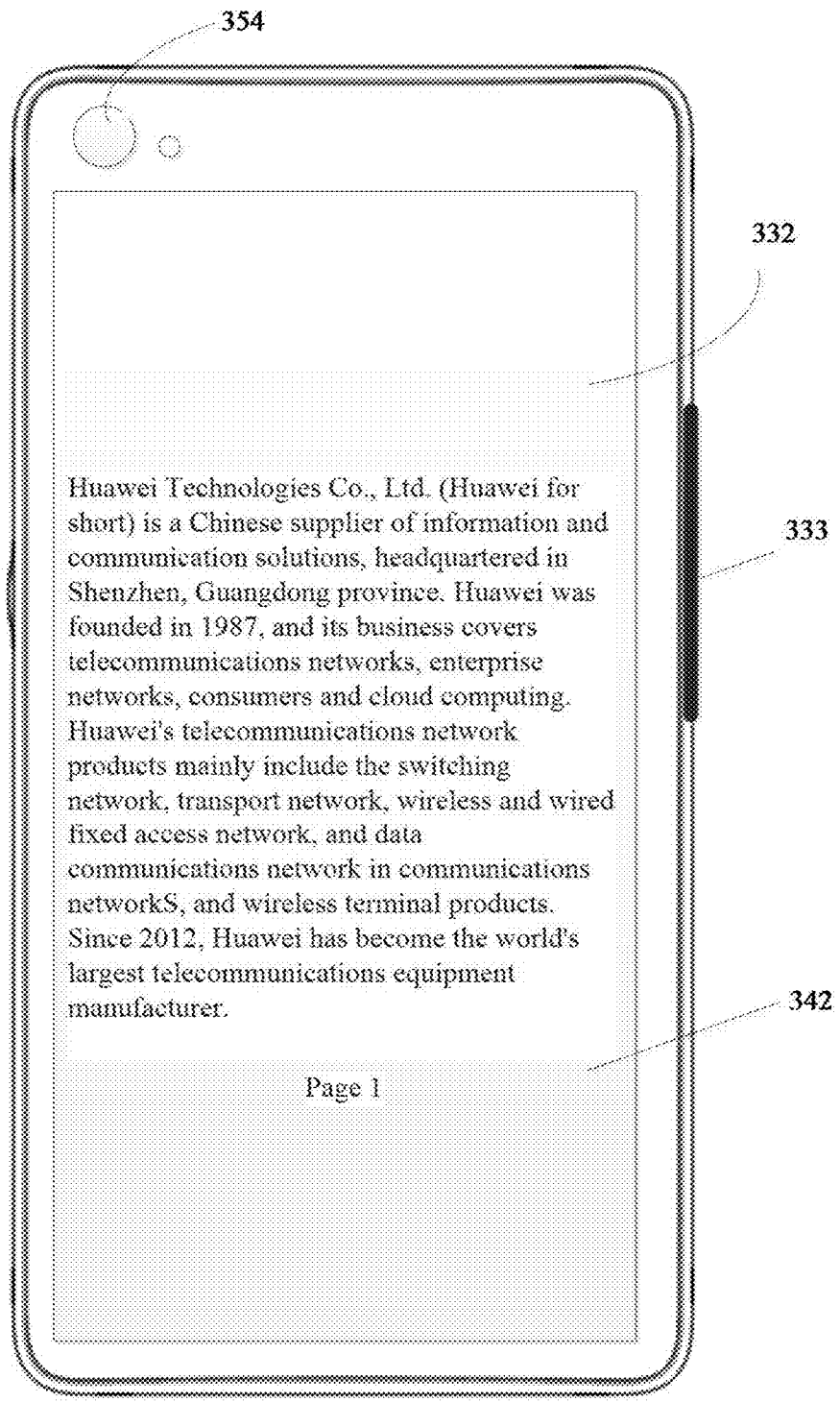
FIG. 11A and FIG. 11B are schematic diagrams of a position of a third touch panel in some other embodiments.
Figure 11B:
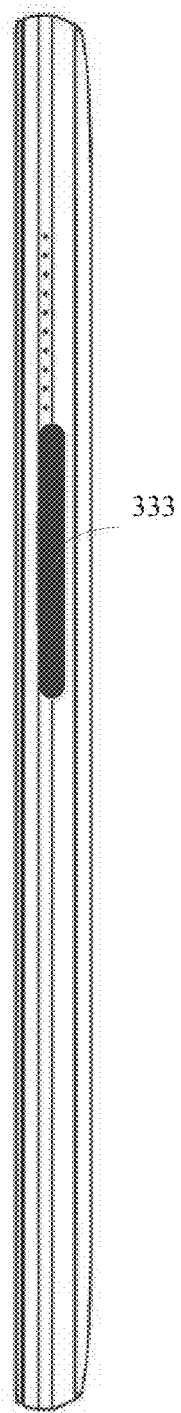

As shown in FIG. 2A and FIG. 2B, in some embodiments, the mobile phone 300 includes the front face A and the rear face B. On the front face A, three optical touch keys 201, 202, and 203 are disposed at the bottom, and the first touch panel 331 and the first display panel 341 are further disposed. The first touch panel 331 covers the first display panel 341. After detecting a touch operation on or near the first touch panel 331, the first touch panel 331 transfers the touch operation to the processor 380, to determine a touch event. After that, the processor 380 provides corresponding visual output on the first display panel 341 based on a type of the touch event. Although the first touch panel 331 and the first display panel 341 are used as two separate components to implement input and output functions of the mobile phone 300 in FIG. 3, in some embodiments, the first touch panel 331 and the first display panel 341 may be integrated to implement the input and output functions of the mobile phone 300. The integrated first touch panel 331 and first display panel 341 may be referred to as a first touch display screen. On the rear face B, the second touch panel 332 and the second display panel 342 are disposed, and the second touch panel 332 covers the second display panel 342. Functions of the second touch panel 332 and the second display panel 342 are similar to those of the first touch panel 331 and the first display panel 341. In some embodiments, on the rear face B of the mobile phone 300, a third touch panel 333 may be further included. The third touch panel 333 may not overlap with the second touch panel 332 or the second display panel 342 (as shown in FIG. 5). In some other embodiments, the third touch panel 333 may alternatively be configured on a side face of the mobile phone 300, as shown in FIG. 1A and FIG. 11B. The third touch panel 333 may be in a strip shape and is applicable to the narrow side face. In this way, the display panel on the rear face of the mobile phone may be made larger. It may be understood that the third touch panel 333 on the side face may alternatively be integrated with a volume key. After detecting a touch operation on or near the third touch panel 333, the third touch panel 333 transfers the touch operation to the processor 380, to determine a type of a touch event. After that, the processor 380 provides corresponding visual output on the first display panel 341 and/or the second display panel 342 based on the touch event. In some embodiments, the second touch panel 332 and the second display panel 342 may be integrated to implement the input and output functions of the mobile phone 300. The integrated second touch panel 332 and second display panel 342 may be referred to as a second touch display screen.

In some other embodiments, pressure sensors may be further disposed on the first touch panel 331, the second touch panel 332, and the third touch panel 333. In this way, when the user performs a touch operation on the foregoing touch panels, the touch panels can further detect a pressure of the touch operation, so that the mobile phone 30X) can more accurately detect the touch operation.

The mobile phone 300 may further include at least one sensor 350, for example, a light sensor, a motion sensor, and another sensor. Specifically, the light sensor may include an ambient light sensor and a proximity sensor. As shown in FIG. 2A, an ambient light sensor 351 is capable of adjusting a luminance of the first display panel 341 and/or the second display panel 342 based on brightness of ambient light. A proximity sensor 352 is disposed on the front face of the mobile phone 300. When the mobile phone 300 moves to an ear, based on detection by the proximity sensor 352, the mobile phone 300 turns off a power supply of the first display panel 341, and may also turn off a power supply of the second display panel 342 at the same time. In this way, the mobile phone 300 may further save power. As one type of motion sensor, an accelerometer sensor is capable of detecting a magnitude of an acceleration in each direction (usually three axes), and may detect, in a static state, a magnitude and a direction of gravity. The accelerometer sensor may be applied to a mobile phone posture recognition application (for example, screen switching between a landscape mode and a portrait mode, a related game, or magnetometer posture calibration), a vibration recognition-related function (for example, a pedometer and tapping), and the like. For another sensor that may be further disposed in the mobile phone 300, such as a gyroscope, a barometer, a hygrometer, a thermometer, or an infrared sensor, details are not described herein.

The audio frequency circuit 360, a speaker 361, and a microphone 362 may provide an audio interface between the user and the mobile phone 300. The audio frequency circuit 360 may transmit, to the speaker 361, a signal converted from received audio data, and the speaker 361 converts the signal into a sound signal for output. In addition, the microphone 362 converts a collected sound signal into an electrical signal, and the audio frequency circuit 360 receives the electrical signal, converts the electrical signal into audio data, and then outputs the audio data to the RF circuit 310, to send the audio data to, for example, another mobile phone, or outputs the audio data to the memory 320 for further processing.

Wi-Fi is a short-range wireless transmission technology. By using the Wi-Fi module 370, the mobile phone 300 may allow the user to receive and send an email, browse a web page, access streaming media, and the like. The Wi-Fi module 370 provides wireless broadband Internet access for the user.

The processor 380 is a control center of the mobile phone 300, and is connected to all components of the entire mobile phone by using various interfaces and lines. The processor 380 runs or executes the software program stored in the memory 320 and invokes the data stored in the memory 320, to perform the functions of the mobile phone 300 and process data, so as to perform overall monitoring on the mobile phone. In some embodiments, the processor 380 may include one or more processing units. An application processor and a modem processor may be further integrated in the processor 380. The application processor primarily processes an operating system, a user interface, an application program, and the like, and the modem processor primarily processes wireless communication. It may be understood that the modem processor may not be integrated into the processor 380.

A Bluetooth module 381 is configured to exchange information with another device by using Bluetooth, a short-range communications protocol. For example, the mobile phone 300 may establish, by using the Bluetooth module 381, a Bluetooth connection to a wearable electronic device (for example, a smartwatch) that also has a Bluetooth module, to exchange data.

The mobile phone 300 further includes the power supply 390 (for example, a battery) that supplies power to each component. The power supply may be logically connected to the processor 380 by using a power supply management system, to implement functions such as charging management, discharging management, and power consumption management by using the power supply management system. It may be understood that, in the following embodiments, the power supply 390 may include two power supplies: One power supply is mainly configured to supply power to the first display panel 341 and the first touch panel 331, and the other power supply is mainly configured to supply power to the second display panel 342, the second touch panel 332, and the third touch panel 333.

The mobile phone 300 may further include a front-facing camera 353, a rear-facing camera 354, and the like. Details are not described herein.

All methods in the following embodiments may be implemented in the mobile phone 300 having the foregoing hardware structure.

Figure 4:
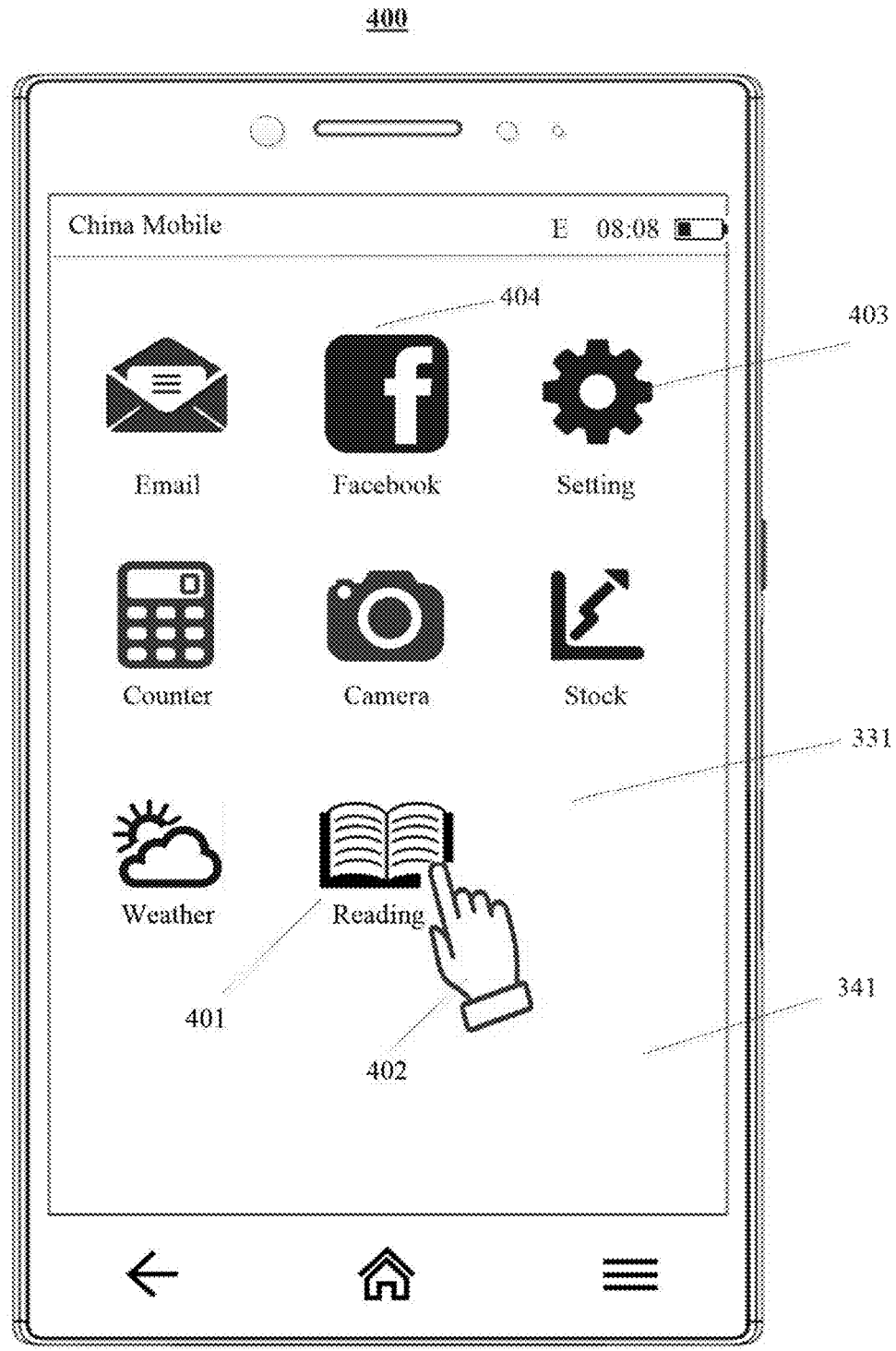
FIG. 4 is a schematic diagram of a graphical user interface displayed by a first display panel 341 on a front face of a mobile phone in some embodiments.

As shown in FIG. 4, there is a first display panel 341 on a front face of a mobile device 400 (for example, a mobile phone 300). The first display panel 341 displays icons of various application programs. For example, an icon 401 represents an application program named reading, an icon 403 represent system setting, and an icon 404 represents Facebook, an existing popular social application program. There is a second display panel 342 on a rear face of the mobile device 400. A display material used by the second display panel 342 may be different from that used by the first display panel 331. Specifically, the first display panel 341 may use a light-emitting diode material commonly used in a mobile device in the prior art, and the second display panel 342 may be a low power-consumption electronic ink screen or the like. In some other embodiments, a second touch panel 332 may be further disposed on the mobile device. A material used by the second touch panel 332 may be the same as or similar to that used by a first touch panel 331, and the second touch panel 332 may also cover the second display panel 342. The mobile device 400 further includes a third touch panel 333. After detecting a touch operation on or near the third touch panel 333, the third touch panel 333 transfers the touch operation to a processor 380, to determine a gesture type of the touch operation. After that, the processor 380 provides corresponding visual output on the first display panel 341 and/or the second display panel 342 based on the gesture type.

In some embodiments, when a user touches or approaches the icon 401 on the first display panel 341 by using a finger 402, the first touch panel 331 of the mobile device 400 detects a touch event on or near the first touch panel 331, and transfers the touch event to the processor 380, to determine an instruction corresponding to the touch event. After that, the processor 380 invokes, according to the instruction, an application program stored in a memory 320, and instructs the first display panel 341 to display a graphical user interface (GUI) of the application program (reading), so that the user can perform a specific operation.

Figure 10A:
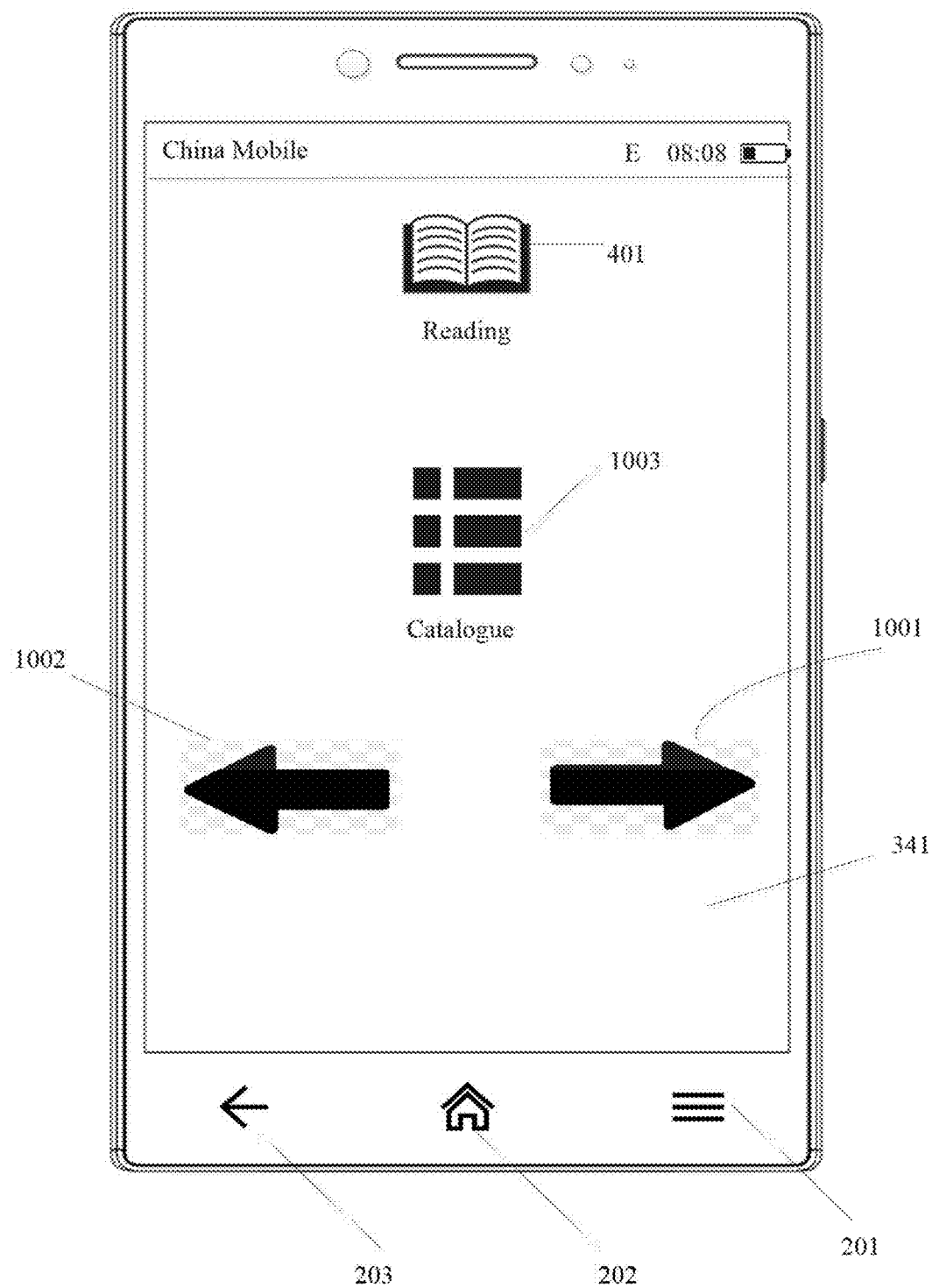
FIG. 10A is a schematic diagram of a graphical user interface displayed by a first display panel on a front face of a mobile device in some embodiments.
Figure 10B:
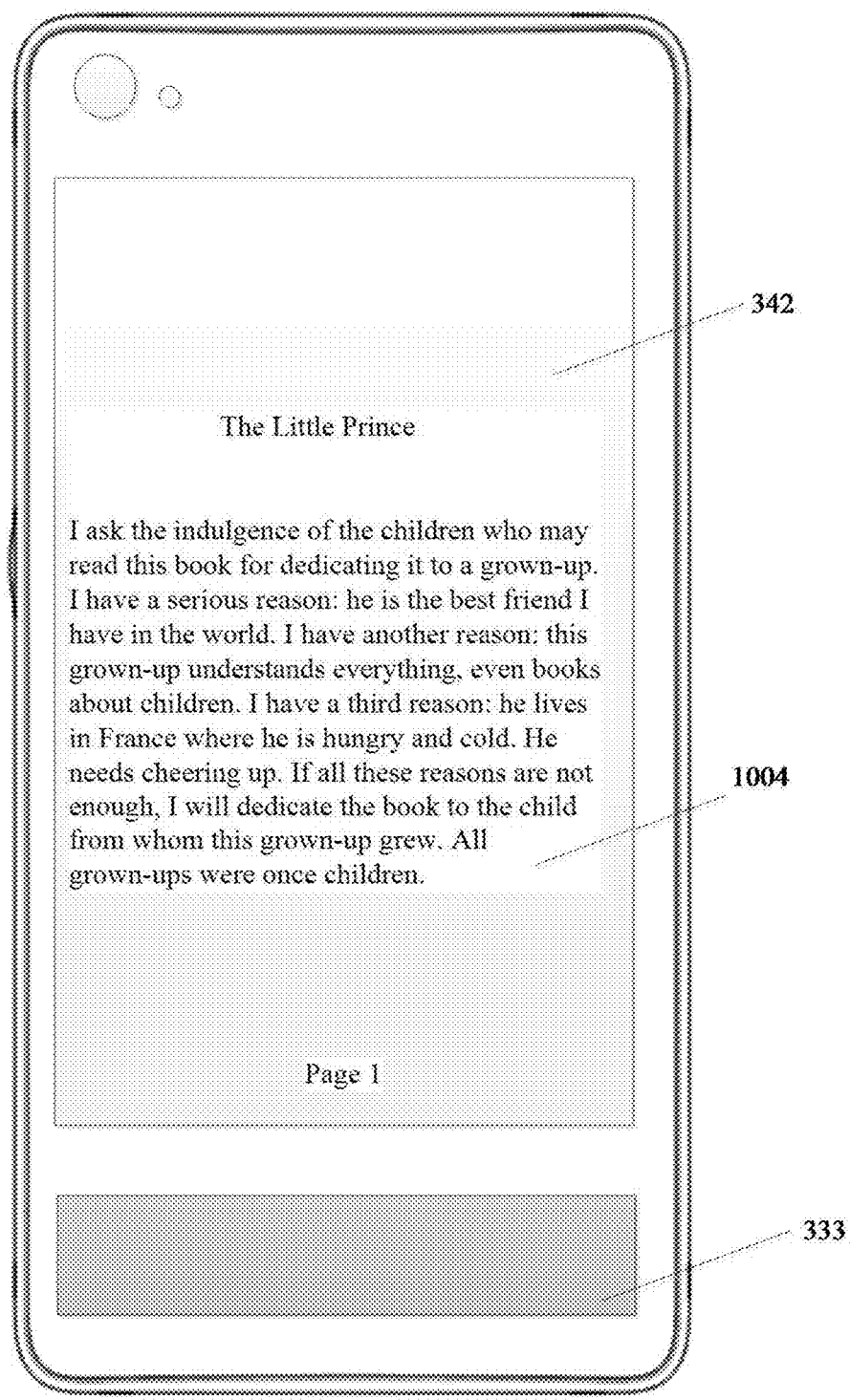
FIG. 10B is a schematic diagram of a graphical user interface displayed by a second display panel on a rear face of a mobile device in some embodiments.

It may be understood that the processor 380 may also instruct the second display panel 342 to display the graphical user interface of the application program. In other words, when the user touches the icon 401 on the front face of the mobile device 400, the GUI of the application program (reading) corresponding to the icon 401 is displayed on the second display panel 342 on the rear face of the mobile device 400, so that the user performs reading on the low power second display panel 342. This also saves a power supply of the mobile device 400. In some other embodiments, the processor 380 may alternatively instruct the first display panel 341 to display some GUIs of the application program, and other GUIs are displayed on the second display panel 342. In this way, the user can focus more on content of interest, and a screen splitting function can be implemented. It may be understood that the some GUIs displayed on the first display panel 341 may be specifically iconic controls of the application program and the other GUIs displayed on the second display panel 342 may mainly be substantial content of the application program. For example, as shown in FIG. 10A, when the user touches or approaches the icon 401 on the first display panel 341 by using the finger 402, if an application program corresponding to the icon is "reading", some controls such as "page up" and "page down" that are not related to substantial content of an ebook (for example, controls such as an icon 1001, an icon 1002, and an icon 1003 representing a catalogue of the ebook) are displayed on the first display panel 341. In addition, as shown in FIG. 10B, specific content 1004 of the ebook in the "reading" application program is displayed on the second display panel 342.

In some other embodiments, when the GUI of the application program is displayed on the second display panel 342 on the rear face of the mobile device 400, the processor 380 may send, to a power supply management system in a power supply 390, an instruction for interrupting a power supply of the first display panel 341. After receiving the instruction, the power supply management system turns off the power supply of the first display panel 341, so that the first display panel 341 is in a screen-off state. Alternatively, the processor 380 may send, to the power supply management system, an instruction for making the first display panel 341 sleep. After receiving the instruction, the power supply management system makes the first display panel 341 sleep, so that the first display panel 341 is in a screen-off state. This can further save the power supply of the mobile device 400.

In some other embodiments, the mobile device may alternatively display a GUI of the application program on the second display panel 342 only when determining that the application program is an application program for reading an ebook or the like. In other words, the second display panel 342 may allow displaying of only an application program of a specific type, for example, an application program of a reading type. The mobile device may determine a type of an application program in a plurality of manners, for example, determines a type of an application program based on a category attribute (for example, a game, reading, or communication) of the application program. In this embodiment of this application, the mobile device displays, only when determining that an application program corresponding to an icon tapped by a user is an application program of the reading type, a GUI of the application program on the second display panel 342. If determining that the application program corresponding to the icon tapped by the user is not an application program of the reading type, the mobile device displays the GUI of the application program on the first display panel 341, to facilitate a further operation of the user.

When there is content (for example, the GUI of the "reading" application program) displayed on the second display panel 342, the third touch panel 333 is activated, to receive a touch operation of the user. That the third touch panel 333 is activated may be specifically: the third touch panel 333 is powered on by the power supply 390 and can detect the touch operation of the user on or near the third touch panel 333. It may be understood that the third touch panel 333 may alternatively be activated only when a particular GUI is displayed on the second display panel 342. For example, the third touch panel 333 is activated only when the second display panel 342 displays content of a particular chapter of an ebook (for example, chapters displayed in FIG. 7A and FIG. 7B) in the "reading" application program, so that the mobile device saves more power.

As shown in FIG. 5, when a touch event of a finger 501 of the user is detected on the third touch panel 333, the processor 380 invokes, based on the touch event, an instruction corresponding to the touch event, and executes the instruction.

Generally, the touch event may be a rightward (or leftward) sliding gesture or the like made by the user on the third touch panel 333. After collecting the touch event, the third touch panel 333 sends data related to the touch event to the processor 380. Based on the received data, the processor 380 determines and invokes the instruction corresponding to the touch event. If the instruction corresponding to the touch event is an instruction used for fast page flip, a result of executing the instruction is: fast turning the ebook displayed on the second display panel 342 to a particular page and displaying the particular page. In some embodiments, the processor 380 may further calculate a speed of the touch event based on the related data of the touch event, and then determine, based on the speed, a specific speed for performing page flip on the displayed ebook. For example, a faster speed of a sliding gesture leads to a faster page flip speed, in other words, more pages are flipped. On the contrary, a slower speed of a sliding gesture leads to a slower page flip speed, in other words, fewer pages are flipped. In some other embodiments, the processor 380 may alternatively calculate a sliding track length of the touch event on the third touch panel 333 based on the related data of the touch event, and determine, based on the calculated length, a specific speed for performing page flip on the displayed ebook. For example, a longer sliding track length of a sliding gesture leads to a faster page flip speed, in other words, more pages are flipped.

Figure 6:
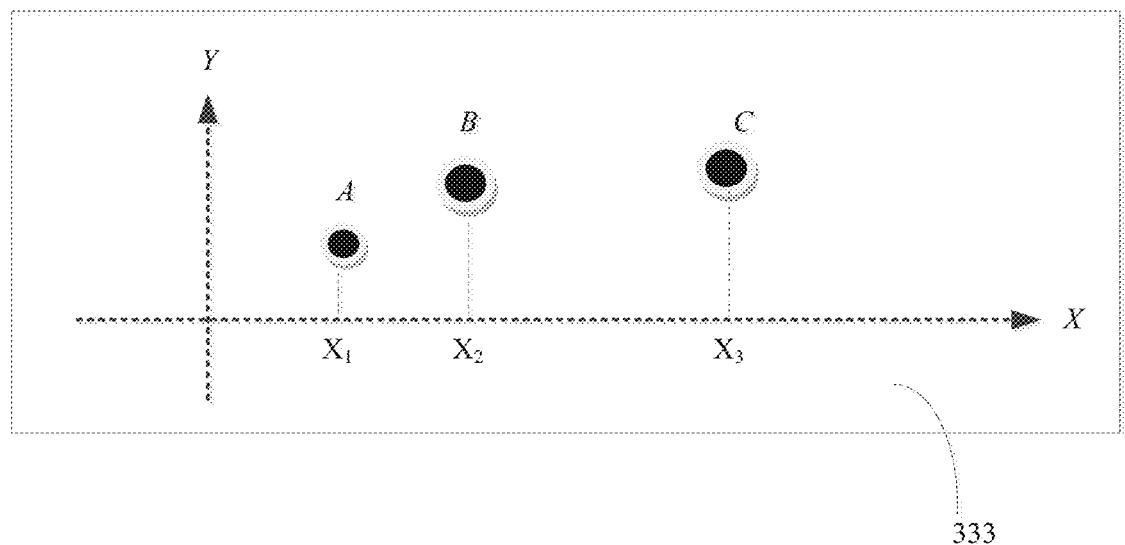
FIG. 6 is a schematic diagram of a track of a touch event on a third touch panel 333 in some embodiments.

As shown FIG. 6, the third touch panel 333 detects positions of three touch points A, B, and C of the finger at different time points $t_1$, $t_2$, and $t_3$. Position coordinates of the three touch points on the third touch panel 333 may be respectively expressed as $(x_1, y_1)$, $(x_2, y_2)$, and $(x_3, y_3)$. The processor 380 may determine a speed or an acceleration of the touch event in an X-axis direction based on the different time points and the position coordinates of the three different touch points, so as to determine, based on the calculated speed or acceleration, the speed for performing page flip on the displayed ebook. It may be understood that a person skilled in the art may also determine a specific gesture of a touch event by using another technical solution. This is not limited in this embodiment.

In some other embodiments, the processor 380 may first determine, based on the touch event, a gesture corresponding to the touch event, and then execute a corresponding instruction based on the determined gesture.

Specifically, the touch event may be a flick gesture, that is, slightly tapping a touch panel (for example, the first touch panel 331 or the second touch panel 332) with a single finger, then quickly sliding, and then quickly leaving the touch panel, for example, scrolling a screen up or down or switching to a left or right picture. The touch event may alternatively be a slide gesture, that is, slightly tapping a touch panel with a single finger, keeping the finger in contact with the touch panel, and then moving, for example, sliding to unlock. The touch event may alternatively be a swipe gesture, that is, touching a touch panel with a plurality of fingers, keeping the fingers in contact with the touch panel, and then moving, for example, pinching with three fingers to return to a home screen. The touch event may alternatively be a tap gesture, that is, slightly tapping a touch panel with a single finger and then leaving the touch panel immediately. The touch event may alternatively be a double tap gesture, that is, performing a tap gesture operation twice within an extremely short time. The touch event may alternatively be a touch & hold gesture, that is, slightly tapping a touch panel with a finger and keeping the finger resting on the touch panel. The touch event may alternatively be a drag gesture, that is, slightly tapping a touch panel with a finger and slowly moving the finger without leaving the touch panel (usually, to a determined target position, for example, dragging a file to a trash box to delete the file). The touch event may alternatively be a pinch gesture, that is, pinching on a touch panel with two fingers (usually a thumb and an index finger). The touch event may alternatively be an unpinch gesture, that is, stretching on a touch panel with two fingers (usually a thumb and an index finger). It may be understood that, in addition to the foregoing listed gestures, the touch event may be further a gesture in another form. A form of the touch event is not limited in this embodiment.

In some other embodiments, a pressure sensor may be further disposed on the third touch panel 333. In this way, the third touch panel 333 can detect a pressure imposed by the user on the touch panel, so that the processor 380 performs more complex and accurate processing. For example, the mobile device may determine a page flip direction based on a gesture direction, and then determine, based on a pressure value of a touch event, a specific quantity of pages that need to be flipped; and may also determine a change of a page flip speed based on a pressure value change, and display different animation effects on the second display panel 342.

The mobile device may determine the gesture of the touch event by using different technical solutions. Specifically, the third touch panel 333 may collect a touch position of a finger on the third touch panel 333 once every 10 milliseconds (ms) after a touch by the user finger is detected, and send collected related data to the processor 380. The processor 380 determines a gesture of the touch event based on the collected related data. For example, the third touch panel 333 determines the gesture of the touch event based on collected different touch positions of the finger at different time points. It may be understood that, if the pressure sensor is disposed on the third touch panel 333, the third touch panel 333 not only can detect touch positions of the user on the third touch panel 333 at different time points, but also can detect pressures imposed by the user on the third touch panel 333 at different time points. In this way, the mobile device 400 can more accurately determine the gesture of the touch event by using parameters collected by the third touch panel 333, such as a time point, a touch position, and a pressure. It may be understood that the processor 380 of the mobile device 400 may further determine a gesture speed based on the foregoing related data detected by the third touch panel 333.

Figure 7A:
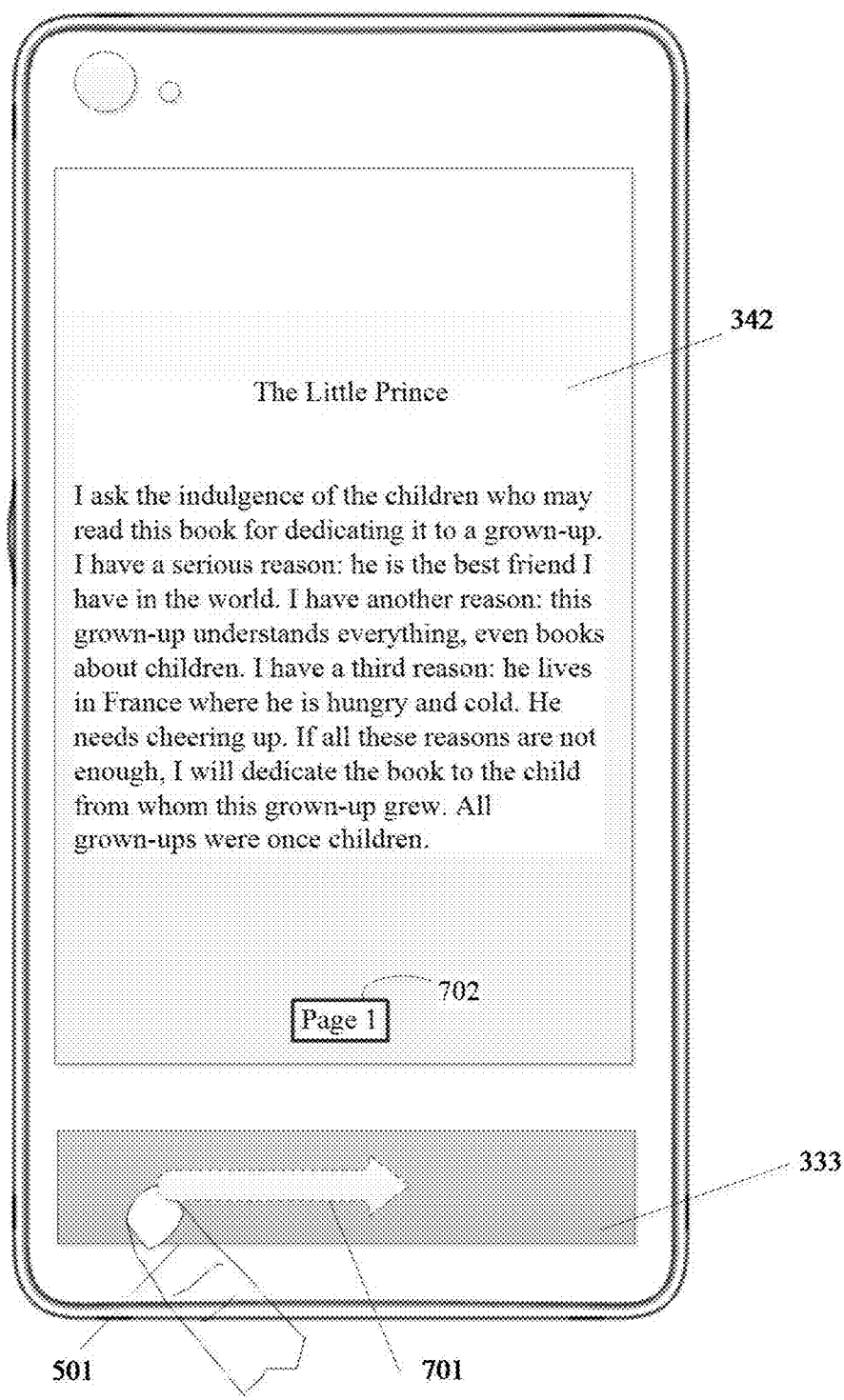
FIG. 7A to FIG. 7D are schematic diagrams of some graphical user interfaces displayed by a second display panel 342 on a rear face of a mobile device in some embodiments.
Figure 7B:
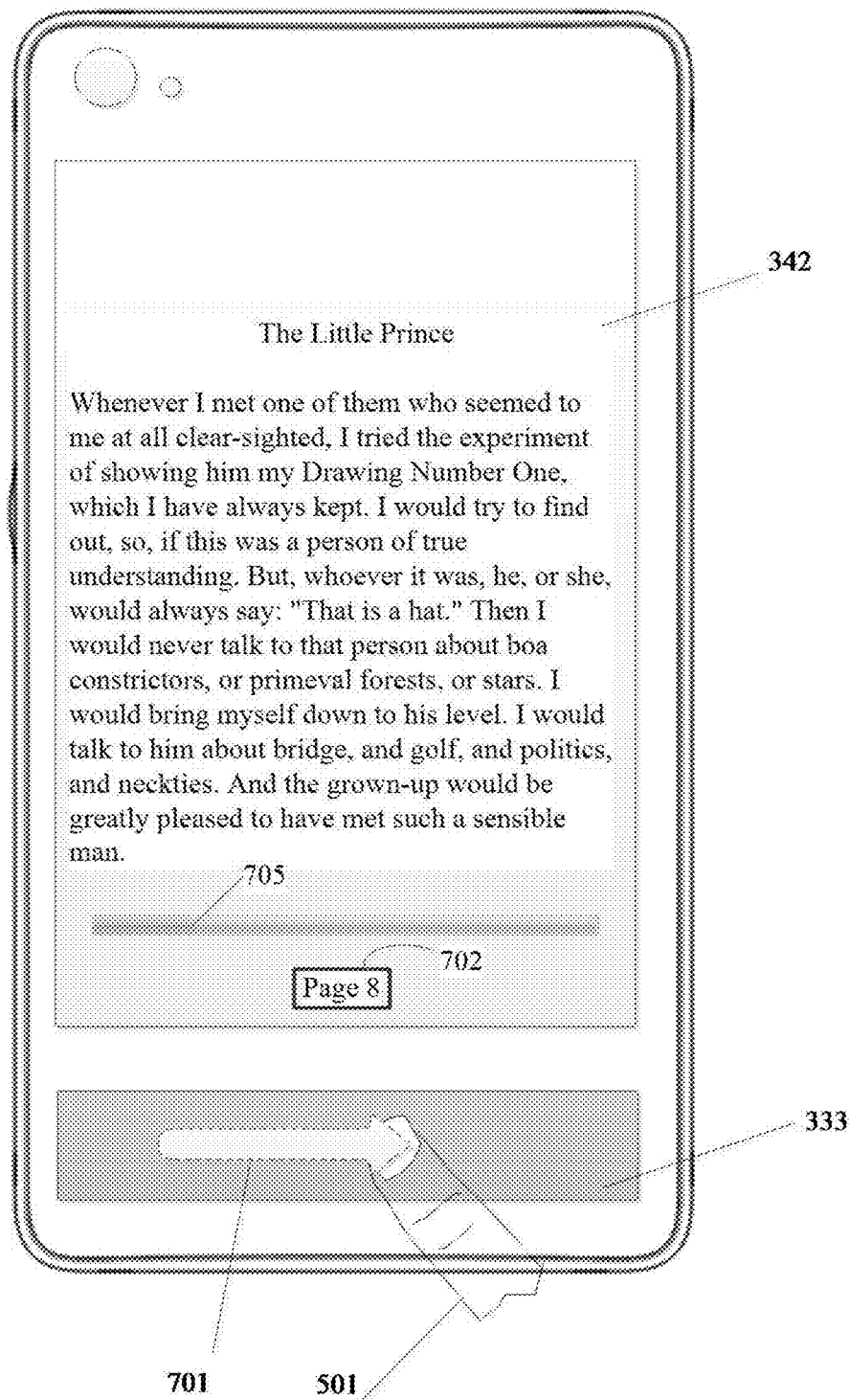

The processor 380 may invoke and execute different instructions based on different gestures. For example, when determining that the touch event is the flick gesture, the processor 380 invokes an instruction corresponding to the flick gesture. A result of executing the instruction is fast flipping pages of the ebook displayed on the second display panel 342 (referred to as a "fast page flip" operation), for example, fast flipping the ebook to page 8 from page 1. It may be understood that a specific page flip speed of the page flip operation may depend on a sliding speed of the flick gesture on the third touch panel 333. As shown in FIG. 7A and FIG. 7B, a rightward sliding track shown by a dotted arrow 701 is made on the third touch panel 333 by using the finger 501 of the user. According to the technical solution in the foregoing embodiments, the third touch panel 333 may send collected data (for example, a time point and a touch position) related to the sliding track to the processor 380. The processor 380 determines, based on the related data, that the touch event (namely, the sliding track) is the flick gesture, and calculates a speed and/or a direction of the gesture based on the related data. The related data may be data shown in FIG. 6. According to descriptions in the foregoing embodiments, the third touch panel 333 detects positions of three touch points A, B. and C of the finger at different time points $t_1$, $t_2$, and $t_3$. Position coordinates of the three touch points on the third touch panel 333 may be respectively expressed as $(x_1, y_1)$, $(x_2, y_2)$, and $(x_3, y_3)$. The processor 380 may calculate the speed of the flick gesture based on changes of the three touch points A, B, and C on X and Y axes. To improve efficiency of the processor 380, the speed and/or the direction (leftward or rightward) of the gesture may be calculated based on only X-axis coordinate values $x_1$, $x_2$, and $x_3$ of the three touch points and the time points $t_1$, $t_2$, and $t_3$. The processor 380 then fast turns a currently displayed page of an ebook The Little Prince forward to page 8 (as shown by an icon 702 in FIG. 7B), and displays content of page 8 on the second display panel 342. It may be understood that an animation or a like form may be used in a fast page flip process, to inform the user that fast page flip is being performed. It may be understood that, in some other embodiments, a progress bar shown by an icon 705 in FIG. 7B may be displayed on the second display panel 342, so that the user can visually and directly perceive a rough quantity of pages that have been flipped currently and a page flip speed. The progress bar 705 may further display a specific page flip speed.

Figure 7C:
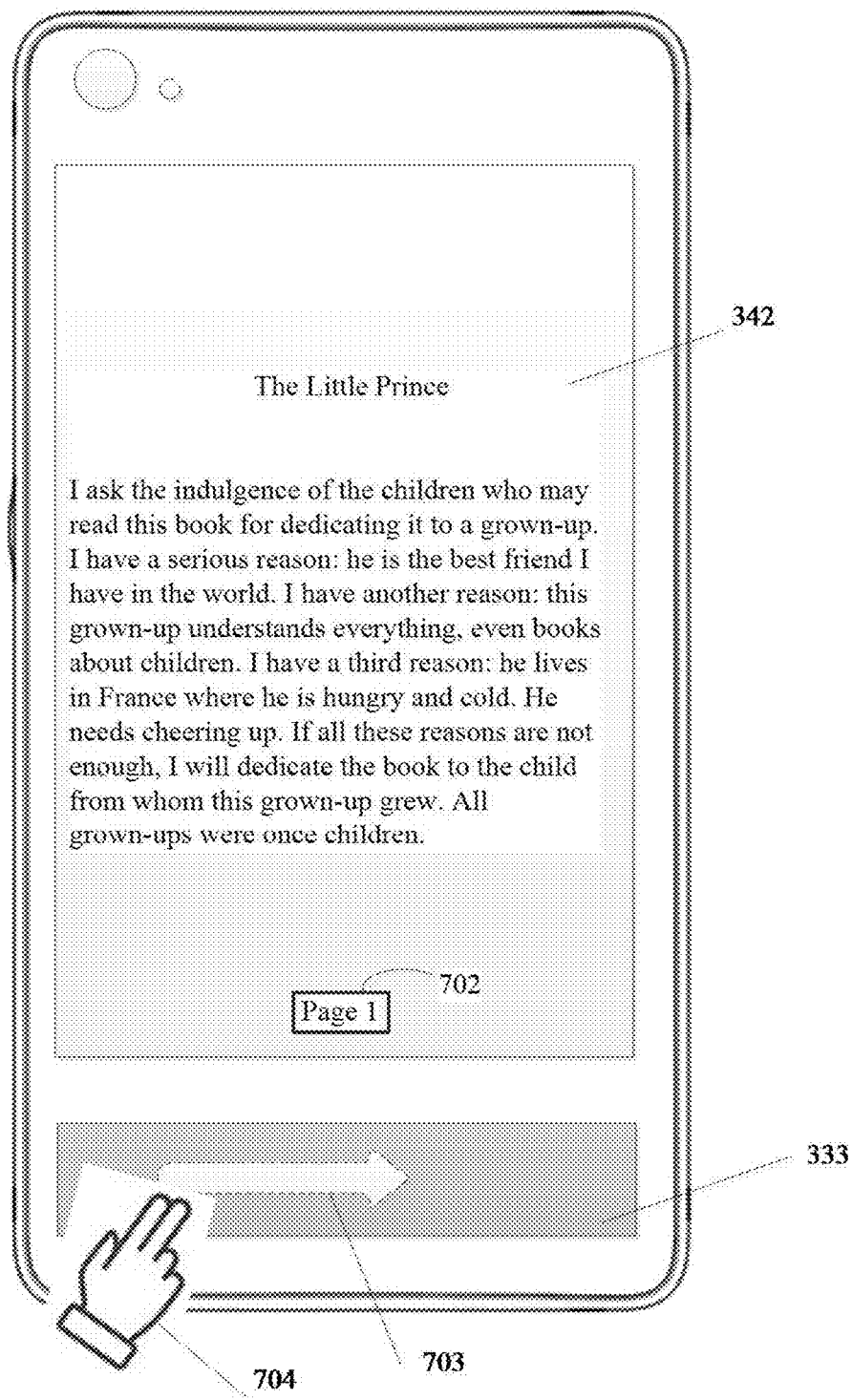
Figure 7D:
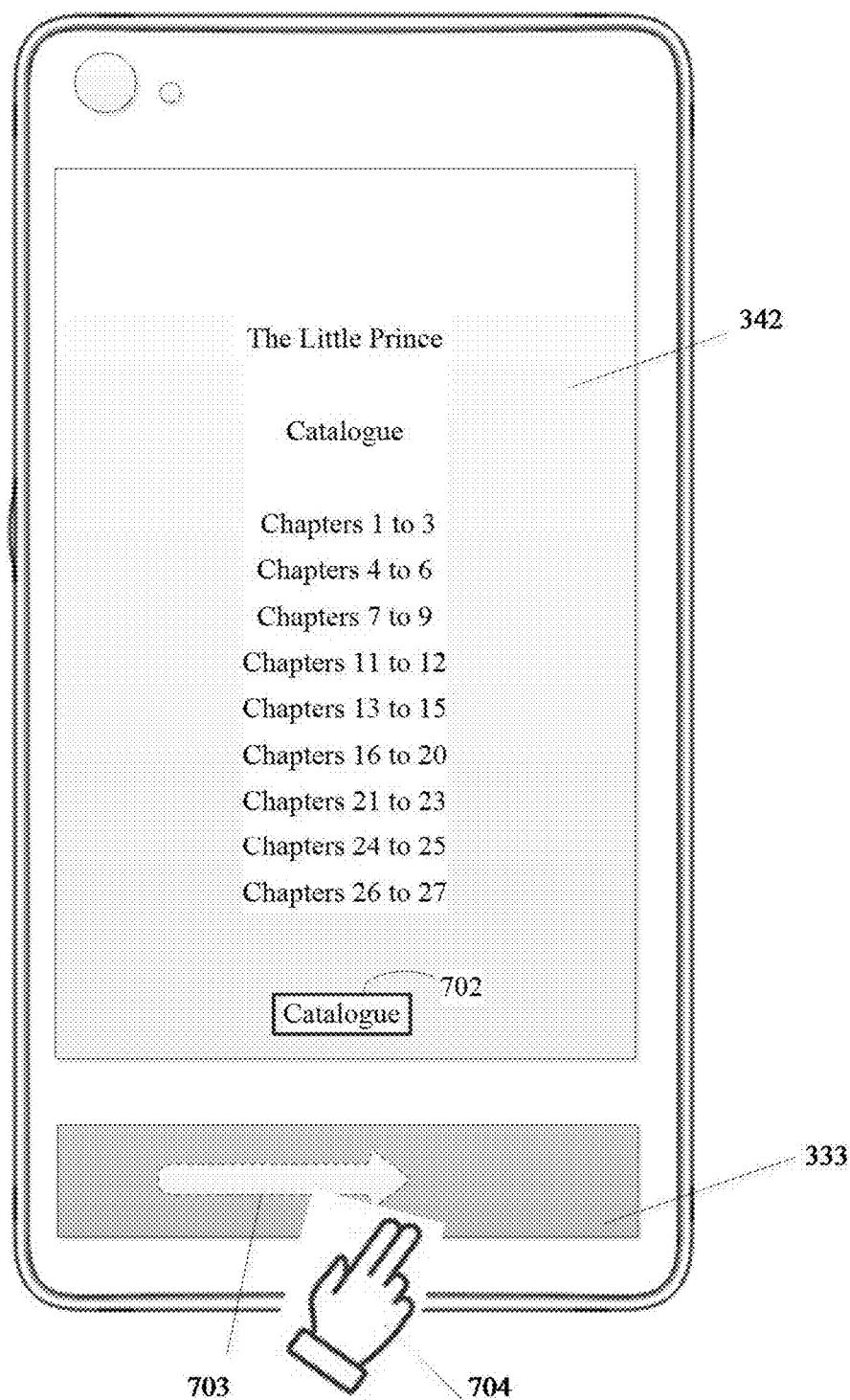

In some embodiments, when the processor 380 determines that the touch event is the swipe gesture, the processor 380 invokes an instruction corresponding to the swipe gesture. A result of executing the instruction is enabling the ebook displayed on the second display panel 342 to return to a catalogue page from a specific content page. As shown in FIG. 7C, the user uses two fingers 704 to make a rightward sliding track shown by a dotted arrow 703 on the third touch panel 333. According to the technical solution in the foregoing embodiments, the third touch panel 333 may send collected data (for example, a time point and touch positions of the two fingers) related to the sliding track to the processor 380. The processor 380 determines, based on the related data, that the touch event (namely, the sliding track) is the swipe gesture. The processor 380 then switches currently displayed content of an ebook The Little Prince to a catalogue (as shown by an icon 702 in FIG. 7D) of the ebook according to the instruction corresponding to the gesture, and displays the catalogue of the ebook on the second display panel 342. It may be understood that an animation or a like form may be used in a process of switching to the catalogue, to inform the user that returning to the catalogue is being performed. In the foregoing embodiments, the touch operation of the user on the third touch panel is detected, to determine to perform processing (for example, page flip or returning to the catalogue) on the content of the ebook displayed on the second display panel. This greatly simplifies operation steps of the user, improves transaction processing efficiency of the mobile device, and further enhances user experience.

In some embodiments, when the processor 380 determines that the touch event is the pinch gesture, the processor 380 invokes an instruction corresponding to the pinch gesture. A result of executing the instruction may be zooming in, to a given multiple, text of specific content of the ebook displayed on the second display panel 342, to enhance a display effect of the ebook. On the contrary, when the processor 380 determines that the touch event is the unpinch gesture, the processor 380 invokes an instruction corresponding to the unpinch gesture. A result of executing the instruction may be zooming out, to a given level, text of specific content of the ebook displayed on the second display panel 342, to reduce a display effect of the ebook and further save power of the mobile device.

In some other embodiments, the second touch panel 332 is further disposed on the rear face of the mobile device. The user may directly perform, on the second touch panel 332, a simple touch operation on an icon displayed on the second display panel 342.

In some other embodiments, the mobile device (for example, a mobile phone) may be used with a wearable device (for example, a smartwatch) paired with the mobile device, to complete the technical solution in the foregoing embodiments. For example, the third touch panel 333 may not be disposed on the mobile phone 30X), but a third touch panel is disposed on the smartwatch. In this way, the user may perform a touch gesture operation on the third touch panel of the smartwatch. The touch gesture operation is compiled into an instruction, and the instruction is sent to the mobile device by using a short-range communications protocol (for example, Wi-Fi or Bluetooth) or the like. After receiving the instruction, the mobile device executes the instruction, so that the second display panel 342 on the rear face of the mobile device displays the specific content of the ebook. It may be understood that the mobile device may execute different instructions based on different gestures in the smartwatch, as described in the foregoing embodiments. Details are not described herein.

Figure 8:
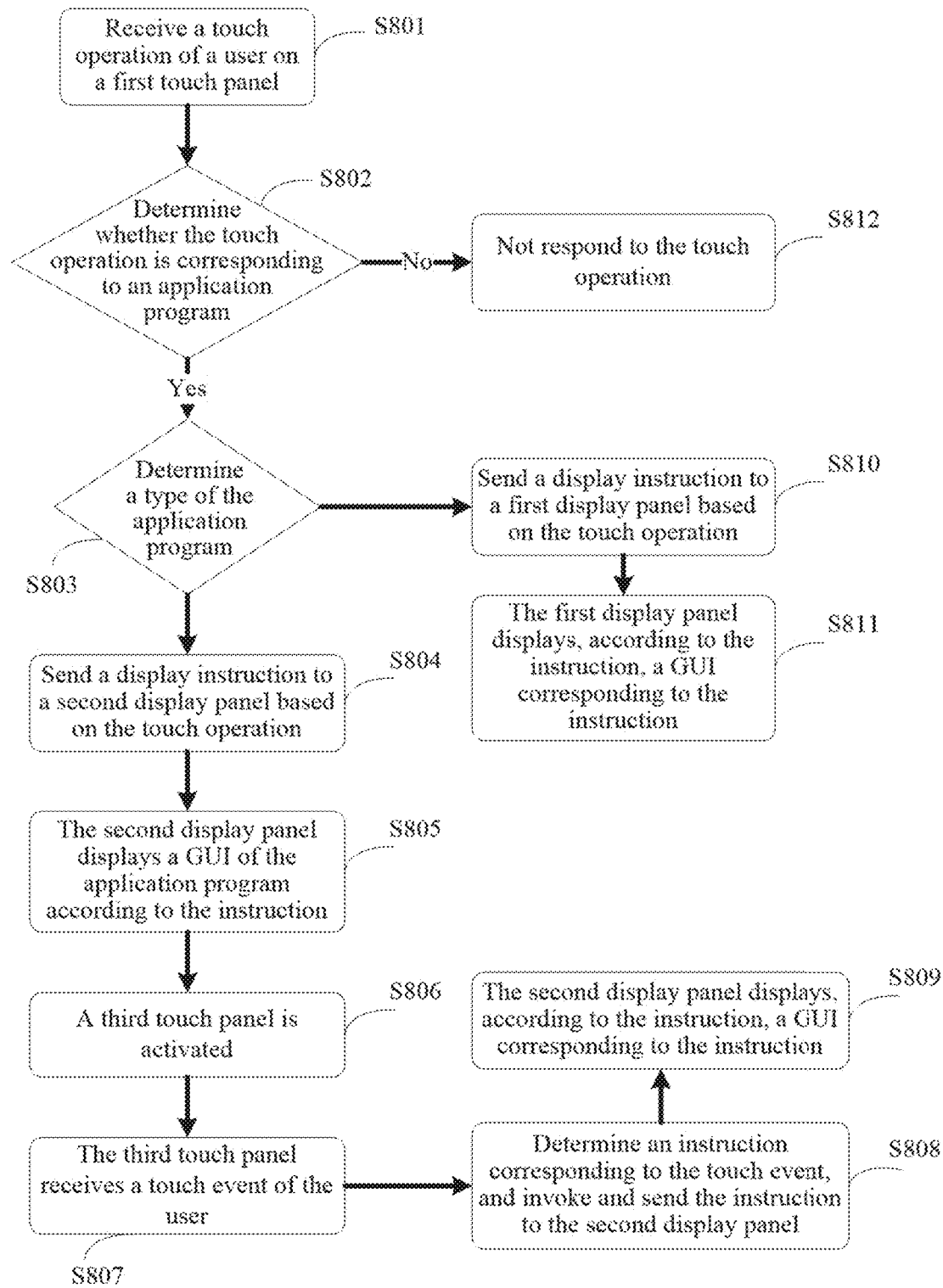
FIG. 8 is a schematic flowchart of a method in some embodiments.

FIG. 8 is a flowchart of a method in some embodiments. A mobile device receives a touch operation of a user on a first touch panel 331 (step S801), where the touch operation may be an operation of tapping, by the user, an icon 401 displayed on a first display panel 341. The mobile device determines whether the touch operation works on an application program (step S802). When the mobile device determines that the touch operation does not work on the application program, the mobile device does not respond to the touch operation (step S812); or when the mobile device determines that the touch operation works on the application program, the mobile device determines a type of the application program (step S803). When the mobile device determines that the type of the application program is a reading type, the mobile device sends a display instruction to a second display panel 342 based on the touch operation (step S804), where the display instruction may be specifically instructing the second display panel 342 to display a GUI of the application program corresponding to the icon touched by the user. When the mobile device determines that the type of the application program is not a reading type, the mobile device may send a display instruction to the first display panel 341 based on the touch operation (step S810), to display a GUI of the application program on the first display panel 341 (step S811). The second display panel 342 of the mobile device displays the GUI of the application program according to the instruction in step 804 (step S805). A third touch panel 333 is activated (step S806). The third touch panel 333 of the mobile device receives a touch event of the user (step S807), where the touch event may be any gesture in the foregoing embodiments. The mobile device determines an instruction corresponding to the touch event, and invokes and sends the instruction to the second display panel 342 (step S808). The second display panel 342 displays, according to the instruction, a GUI corresponding to the instruction (step S809). For example, if the instruction is a page flip instruction, a page flip GUI is displayed on the second display panel 342, or if the instruction is an instruction used for returning to a catalogue, a GUI for returning to the catalogue is displayed on the second display panel 342.

Figure 9:
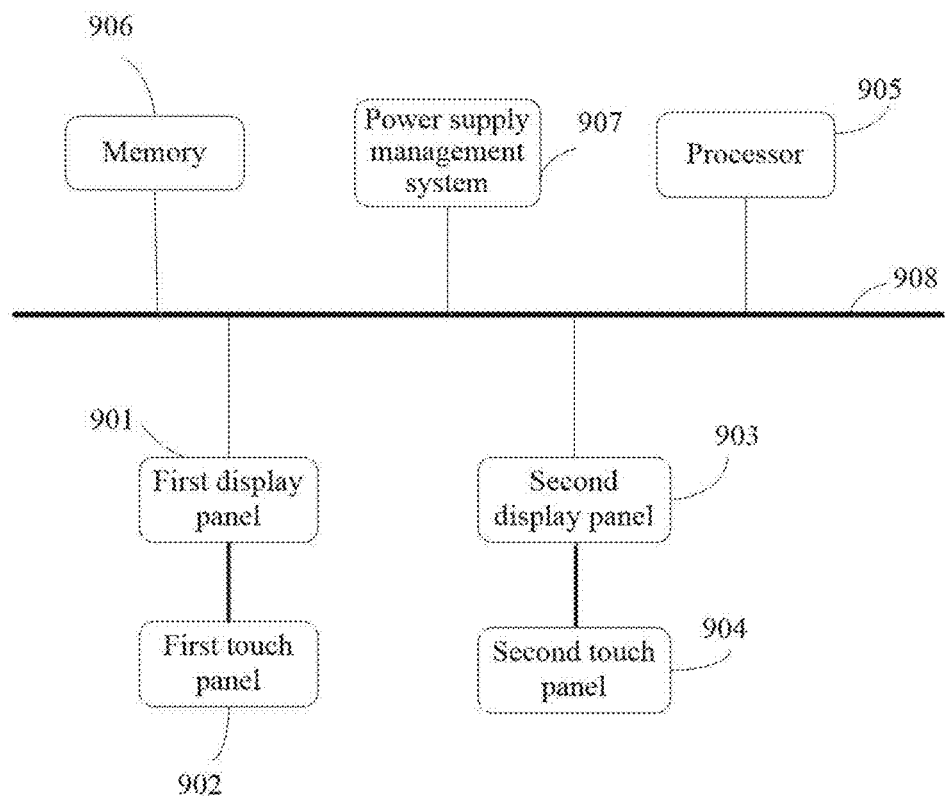
FIG. 9 is a schematic structural diagram of a mobile device in some embodiments.

As shown in FIG. 9, an embodiment provides a mobile device 900 for performing data processing. The technical solutions in the foregoing embodiments may be implemented by the mobile device in this embodiment. The mobile device 900 includes a first display panel 901 and a first touch panel 902 that are disposed on a front face of the mobile device, and a second display panel 903 and a second touch panel 904 that are disposed on a rear face of the mobile device. The mobile device further includes a processor 905, a memory 906, and a power supply management system 907. The foregoing hardware may be connected by using a communications bus 908.

The first display panel 901 is configured to display an icon, a graphical user interface, and a widget of an application program stored in the memory 906.

When the first touch panel 902 detects a touch operation of a user, the processor 905 determines whether the touch operation works on an application program displayed on the first display panel 901.

When the processor 905 determines that the touch operation works on the application program, the processor 905 determines a type of the application program.

When the processor 905 determines that the type of the application program is reading, the processor 905 instructs the second display panel 903 to display a first graphical user interface (first GUI) of the application program, and instructs the power supply management system 907 to turn off a power supply of the first display panel and activate the second display panel 903, where the first GUI is an interface, in the application program, for displaying content of an ebook.

When the second touch panel 904 detects a touch event of the user, the processor 905 determines, based on a speed and a direction of the touch event, an instruction corresponding to the touch event, and executes the instruction.

A result of executing the instruction is: displaying a second graphical user interface (second GUI) of the application program on the second display panel 903 based on the speed and the direction of the touch event, where the second GUI is used to display a catalogue of the ebook.

The first display panel 901 may be a liquid crystal display, and the second display panel 903 may be an electronic ink screen.

Figure 12:
FIG. 12 is a schematic diagram of another graphical user interface displayed by a first display panel on a front face of a mobile device in some embodiments.

In some other embodiments, after it is detected that a user taps an application program "reading" (as shown in FIG. 4), a prompt box may be displayed for the user to choose to display a graphical user interface of the application program on the first display panel 341 (as shown by an icon 1201 in FIG. 12), or display a graphical user interface of the application program on the second display panel 342 (as shown by an icon 1202 in FIG. 12), or display a graphical user interface of the application program on both the first display panel 341 and the second display panel 342 (as shown by an icon 1203 in FIG. 12). After the mobile device receives a selection instruction of the user, the mobile device performs displaying according to a selection of the user. When the selection of the user is starting the application program on the front face, the mobile device displays the GUI of the application program only on the first display panel 341. When the selection of the user is starting the application program on the rear face, the mobile device displays the GUI of the application program only on the second display panel 342, and the power supply of the first display panel 341 may be turned off. When related graphical user interfaces of the application program are displayed on both the first display panel and the second display panel, the graphical user interfaces shown in FIG. 10A and FIG. 10B may be displayed, that is, related controls are displayed on a front face (the first display panel) of a mobile phone, and specific content of an ebook is displayed on a rear face (the second display panel 342) of the mobile phone. In this way, when related content of the ebook is presented to another person, the user may control displayed content of the ebook on the rear face by using some controls (shown in FIG. 10A) on the front face of the mobile phone or a third touch panel on a side face of the mobile phone, so that the user can share related content to another person.

According to the context, the term "if" used in the embodiments may be interpreted as a meaning of "when" or "after" or "in response to determining" or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The terms used in the embodiments are merely for the purpose of illustrating specific embodiments, and are not intended to limit this application. The terms "a", "said" and "the" of singular forms used in the embodiments and the appended claims are also intended to include plural forms, unless otherwise specified in the context clearly. It should also be understood that the term "and/or" used herein indicates and includes any or all possible combinations of one or more associated listed items.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

For a purpose of explanation, the foregoing descriptions are provided with reference to a specific embodiment. However, the foregoing example discussion is not intended to be detailed, and is not intended to limit this application to a disclosed precise form. According to the foregoing teaching content, many modification forms and variation forms are possible. Embodiments are selected and described to fully illustrate the principles of the technical solutions and practical application of the principles, so that other persons skilled in the art can make full use of technical solutions and various embodiments that have various modifications applicable to conceived specific usage.

What is claimed is:

1. An electronic device comprising:
   a first display disposed on a first part of the electronic device;
   a second display disposed at a first position on a second part of the electronic device;
   a touch panel disposed at a second position of the second part;
   one or more processors; and
   a memory for storing instructions which, when executed by the one or more processors, cause the electronic device to:
   display an icon of a first application on a home screen on the first display;
   display iconic controls of a first application on the first display, display a first graphic user interface (GUI) of the first application on the second display, and activate the touch panel in response to detecting a first gesture on the icon;
   detect a second gesture on the touch panel; and
   display a second GUI of the first application on the second display in response to detecting the second gesture.

2. The electronic device of claim 1, wherein the instructions, when executed by the one or more processors, further cause the electronic device to:
   detect, in the second gesture, coordinate position values of three touch points at different time points;
   determine a speed and a direction of the second gesture based on the coordinate position values and the time points;
   perform, based on the speed and the direction, a fast page flip operation on content of the first application; and
   display the fast page flip operation on the second display.

3. The electronic device of claim 1, wherein the first application is a reading application.

4. The electronic device of claim 1, wherein the second GUI is based on speed and direction of the second gesture.

5. The electronic device of claim 1, wherein the second GUI is a catalogue of the first application.

6. The electronic device of claim 1 configured to detect the second gesture, wherein the second gesture comprises touching the touch panel with a plurality of fingers, keeping the fingers in contact with the touch panel, and moving the fingers in contact with the touch panel.

7. A method for performing data processing in an electronic device, the method comprising:
   displaying a home screen icon of a first application on a first display of the electronic device;
   detecting a first gesture on the icon;
   in response to detecting the first gesture;
      displaying iconic controls of the first application on the first display,
      displaying a first graphical user interface (GUI) of the first application on a second display, and
      activating a touch panel;
   detecting a second gesture on the touch panel;
   displaying a second GUI of the first application in response to the second gesture on the second display,
   wherein the iconic controls are displayed on the first display when the second GUI is displayed on the second display.

8. The method of claim 7, wherein displaying a second GUI of the first application in response to the second gesture, further comprises:
   detecting, in the second gesture, coordinate position values of three touch points at different time points;
   determining a speed and a direction of the second gesture based on coordinate values of the three touch points and the time points; and
   performing, based on the speed and the direction, a fast page flip operation on content of the first application, and displaying the second GUI of the fast page flip operation on the second display.

9. The method of claim 7, wherein the first application is a reading application.

10. The method of claim 7, wherein the second GUI is based on speed and direction of the second gesture.

11. The method of claim 7, wherein the second GUI is a catalogue of the first application.

12. The method of claim 7, wherein the second gesture comprises touching a second touch panel with a plurality of fingers, keeping the fingers in contact with the second touch panel, and moving the fingers in contact with the second touch panel.

13. The method of claim 7, wherein displaying a second GUI of the first application in response to the second gesture further comprises:
  detecting, at different time points $t_1$, $t_2$, and $t_3$, positions of three touch points A, B, and C in the second gesture in terms of coordinate values $(x_1\ y_1)$, $(x_2, y_2)$, and $(x_3, y_3)$;
  determining a speed and a direction of the second gesture based on X-axis coordinate values $x_1$, $x_2$, and $x_3$ of the three touch points A, B, and C and the time points $t_1$, $t_2$, and $t_3$; and
  performing, based on the speed and the direction, a fast page flip operation on content of the first application, and displaying the second GUI of the fast page flip operation on the second display.

14. A computer program product comprising a non-transitory computer-readable medium for storing computer executable instructions that, when executed by one or more processors, cause an apparatus to:
  display an icon of a first application on a home screen on a first display; display iconic controls of the first application on the first display; display a first graphic user interface (GU) of the first application on a second display;
  activate a touch panel in response to detecting a first gesture on the icon; detect a second gesture on the touch panel; and
  display a second GUI of the first application on the second display in response to detecting the second gesture.

15. The computer program product of claim 14, wherein the instructions, when executed by the one or more processors, further cause the electronic device to:
  detect, in the second gesture, coordinate position values of three touch points at different time points;
  determine a speed and a direction of the second gesture based on the coordinate position values and the time points;
  perform, based on the speed and the direction, a fast page flip operation on content of the first application; and
  display the fast page flip operation on the second display.

16. The computer program product of claim 14, wherein the first application is a reading application.

17. The computer program product of claim 14, wherein the second GUI is based on speed and direction of the second gesture.

18. The computer program product of claim 14, wherein the second GUI is a catalogue of the first application.

19. The computer program product of claim 14, wherein the instructions, when executed by the one or more processors, further cause the processors to detect the second gesture, wherein the second gesture comprises touching the touch panel with a plurality of fingers, keeping the fingers in contact with the touch panel, and moving the fingers in contact with the touch panel.

20. The computer program product of claim 14, wherein the instructions, when executed by the one or more processors, further cause the processors to:
  detect, at different time points $t_1$, $t_2$, and $t_3$, positions of three touch points A, B, and C in the second gesture in terms of coordinate values $(x_1\ y_1)$, $(x_2, y_2)$, and $(x_3, y_3)$;
  determine a speed and a direction of the second gesture based on X-axis coordinate values $x_1$, $x_2$, and $x_3$ of the three touch points A, B, and C and the time points $t_1$, $t_2$, and $t_3$; and
  perform, based on the speed and the direction, a fast page flip operation on content of the first application, and display the second GUI of the fast page flip operation on the second display.

\* \* \* \* \*